United States Patent
Aupetit

(10) Patent No.: US 11,794,118 B2
(45) Date of Patent: Oct. 24, 2023

(54) GAME SYSTEM

(71) Applicant: Qatar Foundation for Education, Science and Community Development, Doha (QA)

(72) Inventor: Michael Jean-Marie Aupetit, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 0 days.

(21) Appl. No.: 16/525,435

(22) Filed: Jul. 29, 2019

(65) Prior Publication Data

US 2020/0030704 A1    Jan. 30, 2020

(30) Foreign Application Priority Data

Jul. 30, 2018 (GB) ..................................... 1812399

(51) Int. Cl.
    *A63F 13/822*      (2014.01)
    *A63F 13/426*      (2014.01)

(52) U.S. Cl.
    CPC .......... *A63F 13/822* (2014.09); *A63F 13/426* (2014.09); *A63F 2300/6045* (2013.01); *A63F 2300/6653* (2013.01); *A63F 2300/807* (2013.01)

(58) Field of Classification Search
None
See application file for complete search history.

(56) References Cited

U.S. PATENT DOCUMENTS

| | | | | |
|---|---|---|---|---|
| 3,909,000 A * | 9/1975 | Akers | ................. | A63F 3/00214 273/241 |
| 4,147,360 A * | 4/1979 | Bailey | ................. | A63F 3/00176 273/261 |
| 5,145,181 A * | 9/1992 | Welman | ............. | A63F 3/00214 273/237 |
| 5,860,651 A * | 1/1999 | Fierro | ................. | A63F 3/00214 273/241 |
| 9,849,369 B2 * | 12/2017 | Maharbiz | ............ | A63F 3/00214 |

(Continued)

OTHER PUBLICATIONS

Wyld, Kira A., "Sudoku Variants on the Torus" (2017). HMC Senior Theses. 103. https://scholarship.claremont.edu/hmc_theses/103 (Year: 2017).*
"Is there a video game to learn topology?" Jul. 2015; https://www.quora.com/Is-there-a-video-game-to-learn-topology.
"Topology: The Board Game" Jan. 2013; https://math.stackexchange.com/questions/265405/topology-the-board-game.

(Continued)

*Primary Examiner* — Peter J Iannuzzi
(74) *Attorney, Agent, or Firm* — Martin & Ferraro, LLP

(57) ABSTRACT

A game system comprising a game surface generator configured to generate a game surface having: a primary game surface with a first edge; an additional game surface with a second edge, wherein the primary game surface and the additional game surface are each divided into a plurality of game spaces and the first edge of the primary game surface is coupled to the second edge of the additional game surface, there being a bijective mapping between the primary game surface and the additional game surface; a game piece control module configured to position a plurality of game pieces on the primary game surface such that each game piece is positioned on one of the game spaces and a plurality of additional game pieces are positioned on corresponding game spaces of the additional game surface according to the bijective mapping.

16 Claims, 50 Drawing Sheets

(56) References Cited

U.S. PATENT DOCUMENTS

| | | | | |
|---|---|---|---|---|
| 2002/0101033 A1* | 8/2002 | Pellegrini | ............ | A63F 3/00176 273/260 |
| 2002/0167129 A1* | 11/2002 | Stanton | ............... | A63F 3/00176 273/283 |
| 2003/0020236 A1* | 1/2003 | Tuveson | ................... | A63F 3/02 273/261 |
| 2008/0197569 A1* | 8/2008 | Srinivasa | ............ | A63F 3/00643 273/260 |
| 2008/0296838 A1* | 12/2008 | Peterson | ................... | A63F 3/02 273/261 |
| 2012/0326389 A1* | 12/2012 | Gardner | .............. | A63F 3/00214 273/260 |

OTHER PUBLICATIONS

"Board Game Geek>Board Game Designs>any-games-5-sided-spaces-filling-mapboard" Oct. 2009; https://boardgamegeek.com/thread/450267/any-games-5-sided-spaces-filling-mapboard.

"Topological Tic-Tac-Toe"; Alex Bolton, Oct. 2018; http://chalkdustmagazine.com/features/topological-tic-tac-toe/.

"Chess-on-the-Dot"; Joshua Chao, Feb. 2016; https://www.behance.net/gallery/20813805/Chess-on-the-Dot-(Wooden-Game-Set).

"Concrete Nonsense; Topological Tic Tac Toe 1: The Torus"; Alex Ellis, Apr. 2008; https://concretenonsense.wordpress.com/2008/04/15/topological-tic-tac-toe-1-the-torus/.

"Abstract Strategy Games" Oct. 2010; http://abstractstrategygames.blogspot.com/2010/10/singularity-chess.html.

* cited by examiner

REAL PLANE

CYLINDER

TORUS

MOEBIUS STRIP

KLEIN BOTTLE

REAL PROJECTIVE PLAN

SPHERE

2 MIRRORS

SIMPLE STRIP / CYLINDER

SIMPLE STRIP between two mirrors

2 ADJACENT MIRRORS
+ 2 Converging links

HALF-SPHERE
ON A MIRROR

1 MIRROR + 1 wall + 2 converging links

GAME SYSTEM

CROSS-REFERENCE TO RELATED APPLICATIONS

This application claims priority to Great Britain Application No. GB1812399.2, filed Jul. 30, 2018, entitled "A Game System," the entire contents of which are incorporated herein by reference.

FIELD

The present invention relates to a game system. The present invention more particularly relates to a game system comprising a game surface for use when playing a board game.

BACKGROUND

A conventional board game, such as othello, checkers or chess, has a board which is divided into a plurality of game spaces. The game is played by placing game pieces on the game spaces and by moving, adding or removing game pieces according to the rules of the game being played.

The problem with a conventional board game is that the board game is of limited or finite complexity and so a conventional board game does not encourage abstract thinking. Abstract thinking is an important tool to be learned as part of a STEM subject (science, technology, engineering and mathematics).

There is a need for an improved game system which seeks to encourage abstract thinking.

SUMMARY

According to one aspect of the present invention, there is provided a game system comprising:
a game surface generator configured to generate a game surface having:
  a primary game surface with a first edge;
  an additional game surface with a second edge, wherein the primary game surface and the additional game surface are each divided into a plurality of game spaces and the first edge of the primary game surface is coupled to the second edge of the additional game surface, there being a bijective mapping between the primary game surface and the additional game surface;
  a game piece control module configured to position a plurality of game pieces on the primary game surface such that each game piece is positioned on one of the game spaces and a plurality of additional game pieces are positioned on corresponding game spaces of the additional game surface according to the bijective mapping.

In some embodiments, the game piece control module is configured to move a selected game piece on the primary game surface to a different game space on the primary game surface in response to a movement signal such that a corresponding game piece moves simultaneously on the additional game surface to a corresponding different game space on the additional game surface.

In some embodiments, the system is configured to display the primary game surface and the additional game surface to a user.

In some embodiments, the system is configured to display the primary game surface to a user and to not display the additional game surface to the user.

In some embodiments, the game surface generator configured to generate a game surface having a plurality of additional game surfaces which are coupled to the additional game surface and the primary game surface along a plurality of edges, wherein there is a bijective mapping between the primary game surface and each of the plurality of additional game surfaces.

In some embodiments, the positions of the game pieces on the additional game surface mirror the positions of the game pieces on the primary game surface about the coupled edges of the primary and additional game surfaces.

In some embodiments, the game system is for playing a board game selected from a group including othello, checkers, Chinese checkers or chess.

According to another aspect of the present invention, there is provided a game system comprising:
  a game surface generator configured to generate a game surface and to divide the game surface into an array of game spaces, wherein from any one perspective only a portion of the game surface is visible, there being continuity between the visible portion and a non-visible portion such that the game surface continues past the visible portion to a non-visible portion and there being a bijective mapping between the visible and non-visible portions of the game surface; and
  a game piece control module configured to position a plurality of game pieces on the visible portion of the game surface such that each game piece is positioned on one of the game spaces, wherein the game piece control module is further configured to move a selected game piece on the visible portion of the game surface to a different game space on the visible portion of the game surface in response to a movement signal such that a corresponding game piece moves simultaneously on the non-visible game surface to a corresponding different game space on the non-visible game surface.

In some embodiments, the game surface is a single surface.

In some embodiments, each game space is a fundamental polygon of a plurality of fundamental polygons that are connected to one another to form the game surface.

In some embodiments, the game surface is at least part of a topological closed surface selected from a group including a cylinder, a sphere, a torus, a moebius strip, a Klein bottle or a real projective plane.

In some embodiments, the game surface generator is configured to generate the game surface in a four-dimensional space such that the visible portion of the game surface in three dimensions varies over time.

In some embodiments, the game surface has an edge which couples part of the visible portion with part of the non-visible portion, and wherein the parts of the visible portion and the non-visible portion on either side of the edge mirror one another.

In some embodiments, the game system is for playing a board game selected from a group including othello, checkers, Chinese checkers or chess.

According to a further aspect of the present invention, there is provided a computer-implemented method for providing a board game, the method comprising:
  generating, using a processor and a memory, a game surface having:
    a primary game surface with a first edge;
    an additional game surface with a second edge, wherein the primary game surface and the additional game surface are each divided into a plurality of game spaces and the first edge of the primary game surface is coupled to the second edge of the additional game surface, there being a bijective mapping between the primary game surface and the additional game surface;

positioning a plurality of game pieces on the primary game surface such that each game piece is positioned on one of the game spaces and a plurality of additional game pieces are positioned on corresponding game spaces of the additional game surface according to the bijective mapping.

In some embodiments, the game piece control module is configured to move a selected game piece on the primary game surface to a different game space on the primary game surface in response to a movement signal such that a corresponding game piece moves simultaneously on the additional game surface to a corresponding different game space on the additional game surface.

In some embodiments, the processor is configured to display the primary game surface and the additional game surface to a user.

In some embodiments, the processor is configured to display the primary game surface to a user and to not display the additional game surface to the user.

In some embodiments, the game surface generator is configured to generate a game surface having a plurality of additional game surfaces which are coupled to the additional game surface and the primary game surface along a plurality of edges, wherein there is a bijective mapping between the primary game surface and each of the plurality of additional game surfaces.

In some embodiments, the positions of the game pieces on the additional game surface mirror the positions of the game pieces on the primary game surface about the coupled edges of the primary and additional game surfaces.

In some embodiments, the game system is for playing a board game selected from a group including othello, checkers, Chinese checkers or chess.

According to a further aspect of the present invention, there is provided a computer-implemented method for providing a board game, the method comprising:
   generating, using a processor and a memory, a game surface;
   dividing the game surface into an array of game spaces, wherein from any one perspective only a portion of the game surface is visible, there being continuity between the visible portion and a non-visible portion such that the game surface continues past the visible portion to a non-visible portion and there being a bijective mapping between the visible and non-visible portions of the game surface;
   displaying the visible portion of the game surface to a user;
   positioning a plurality of game pieces on the visible portion of the game surface such that each game piece is positioned on one of the game spaces; and moving a selected game piece on the visible portion of the game surface to a different game space on the visible portion of the game surface in response to a movement signal such that a corresponding game piece moves simultaneously on the non-visible game surface to a corresponding different game space on the non-visible game surface.

In some embodiments, the game surface is a single surface.

In some embodiments, each game space is a fundamental polygon of a plurality of fundamental polygons that are connected to one another to form the game surface.

In some embodiments, the game surface is at least part of a topological closed surface selected from a group including a cylinder, a sphere, a torus, a moebius strip, a Klein bottle or a real projective plane.

In some embodiments, the game surface generator is configured to generate the game surface in a four-dimensional space such that the visible portion of the game surface in three dimensions varies over time.

In some embodiments, the game surface has an edge which couples part of the visible portion with part of the non-visible portion, and wherein the parts of the visible portion and the non-visible portion on either side of the edge mirror one another.

In some embodiments, the method is for playing a board game selected from a group including othello, checkers, Chinese checkers or chess.

According to another aspect of the present invention, there is provided a computer program product stored on a non-transitory computer readable medium comprising instructions which, when executed by a computing device having a processor and a memory, cause the computing device to:
   generate a game surface having:
      a primary game surface with a first edge;
      an additional game surface with a second edge, wherein the primary game surface and the additional game surface are each divided into a plurality of game spaces and the first edge of the primary game surface is coupled to the second edge of the additional game surface, there being a bijective mapping between the primary game surface and the additional game surface;
   position a plurality of game pieces on the primary game surface such that each game piece is positioned on one of the game spaces and a plurality of additional game pieces are positioned on corresponding game spaces of the additional game surface according to the bijective mapping.

According to another aspect of the present invention, there is provided a computer program product stored on a non-transitory computer readable medium comprising instructions which, when executed by a computing device having a processor and a memory, cause the computing device to: generating a game surface;
   divide the game surface into an array of game spaces, wherein from any one perspective only a portion of the game surface is visible, there being continuity between the visible portion and a non-visible portion such that the game surface continues past the visible portion to a non-visible portion and there being a bijective mapping between the visible and non-visible portions of the game surface;
   displaying the visible portion of the game surface to a user;
   positioning a plurality of game pieces on the visible portion of the game surface such that each game piece is positioned on one of the game spaces; and
   moving a selected game piece on the visible portion of the game surface to a different game space on the visible portion of the game surface in response to a movement signal such that a corresponding game piece moves simultaneously on the non-visible game surface to a corresponding different game space on the non-visible game surface.

BRIEF DESCRIPTION OF THE DRAWINGS

So that the present invention may be more readily understood, embodiments of the present invention will now be described, by way of example, with reference to the accompanying drawings, in which.

The color code in the illustrations is representing the "Bijective mapping" in some examples: cells with the same color are linked by a bijective mapping, they correspond to duplication of the cell with that same color in the base board. For example, when one piece is on a "red" cell on the base board and is moved to a "yellow" cell on that board, all its duplications are initially on the exact same color "red" cell in the duplicate boards, and are moved to the corresponding same color "yellow" cell in that same boards after the move, triggering the rules of the game at play (chess, Othello or other) to decide if that move is allowable, or if another or other pieces have to be moved/removed, or other rules apply, depending on that move.

DETAILED DESCRIPTION

Figure 1:
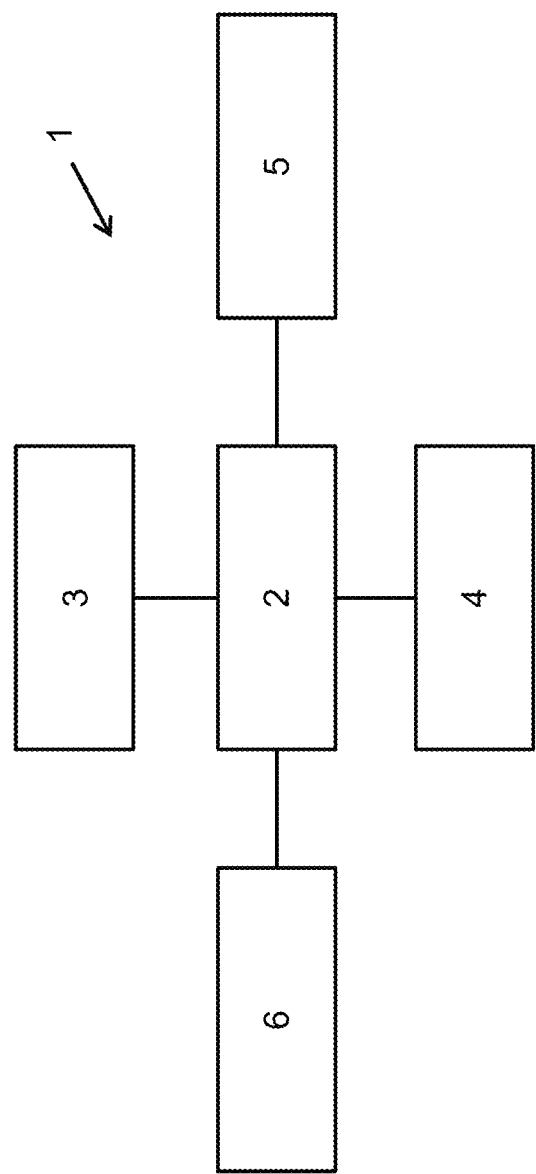
FIG. 1 is a schematic diagram of a game system of some embodiments.

Referring initially to FIG. 1 of the accompanying drawings, a game system 1 of some embodiments comprises a processor 2 which forms part of a computing device or system. The processor 2 is coupled to a memory 3 which is configured to store data to be processed by the processor 2.

The system 1 comprises a graphical user interface module 4 which provides a graphical user interface output via a display to a user. The graphical user interface module 4 is preferably further configured to receive inputs from a user such that a user can input commands to control the game system 1. In other embodiments, the system 1 is configured to receive user inputs via a different user interface, such as a keyboard or by a remote command transmitted over a network, such as the Internet.

The system 1 further comprises a game surface generator module 5 which is configured to generate a game surface and to divide the game surface into an array of game spaces. In some embodiments, the entirety of the game surface may be available for game-play and when the game surface is displayed to a user via the graphical user interface module 4, only a portion of the game surface is visible. The game surface is generated such that there is continuity between the visible portion and a non-visible portion of the game surface such that the game surface continues past the visible portion to a non-visible portion. The system and method for generating the game surface will be discussed in more detail in the following description.

The system 1 further comprises a game piece control module 6 which is configured to position a plurality of game pieces on the generated game surface. The game piece control module 6 positions the game pieces such that each game piece is positioned on one of the game spaces. The game piece control module 6 is further configured to move a selected game piece to a different game space in response to a movement signal, such as a control input provided by a user via the graphical user interface module 4.

The generation of the game surface will now be described in more detail with reference to FIGS. 2 and 3.

The game surface is generated by connecting a plurality of fundamental polygons to one another in a manner which is known to those skilled in the art for forming topological surfaces. The fundamental polygons are joined to one another to form the game surface. In some embodiments, the game surface is a closed surface.

Figure 2:
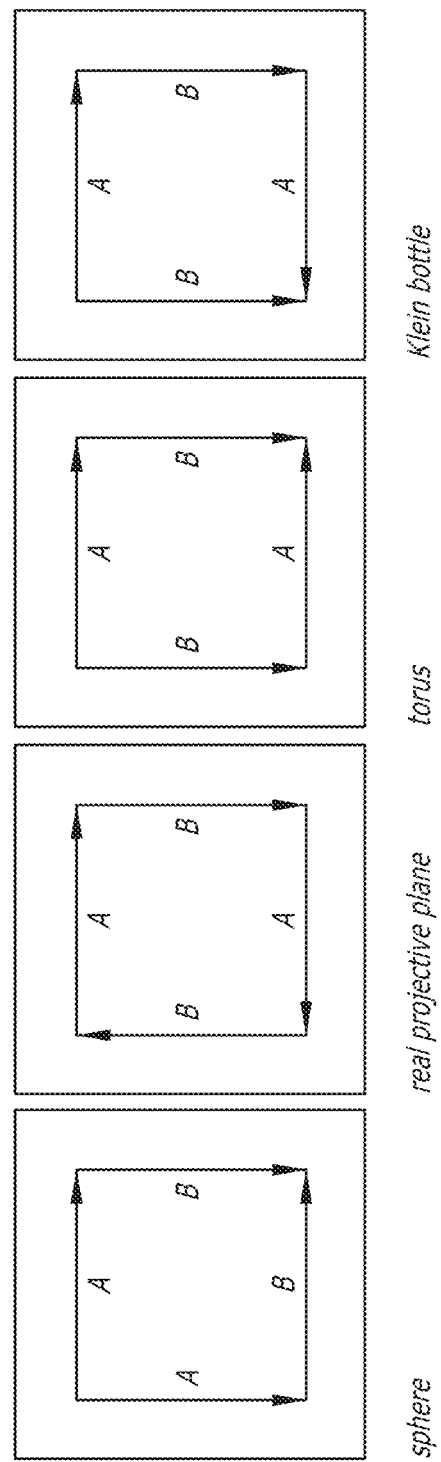
FIG. 2 is a schematic diagram illustrating a notation for constructing a topological surface from polygons.
Figure 3:
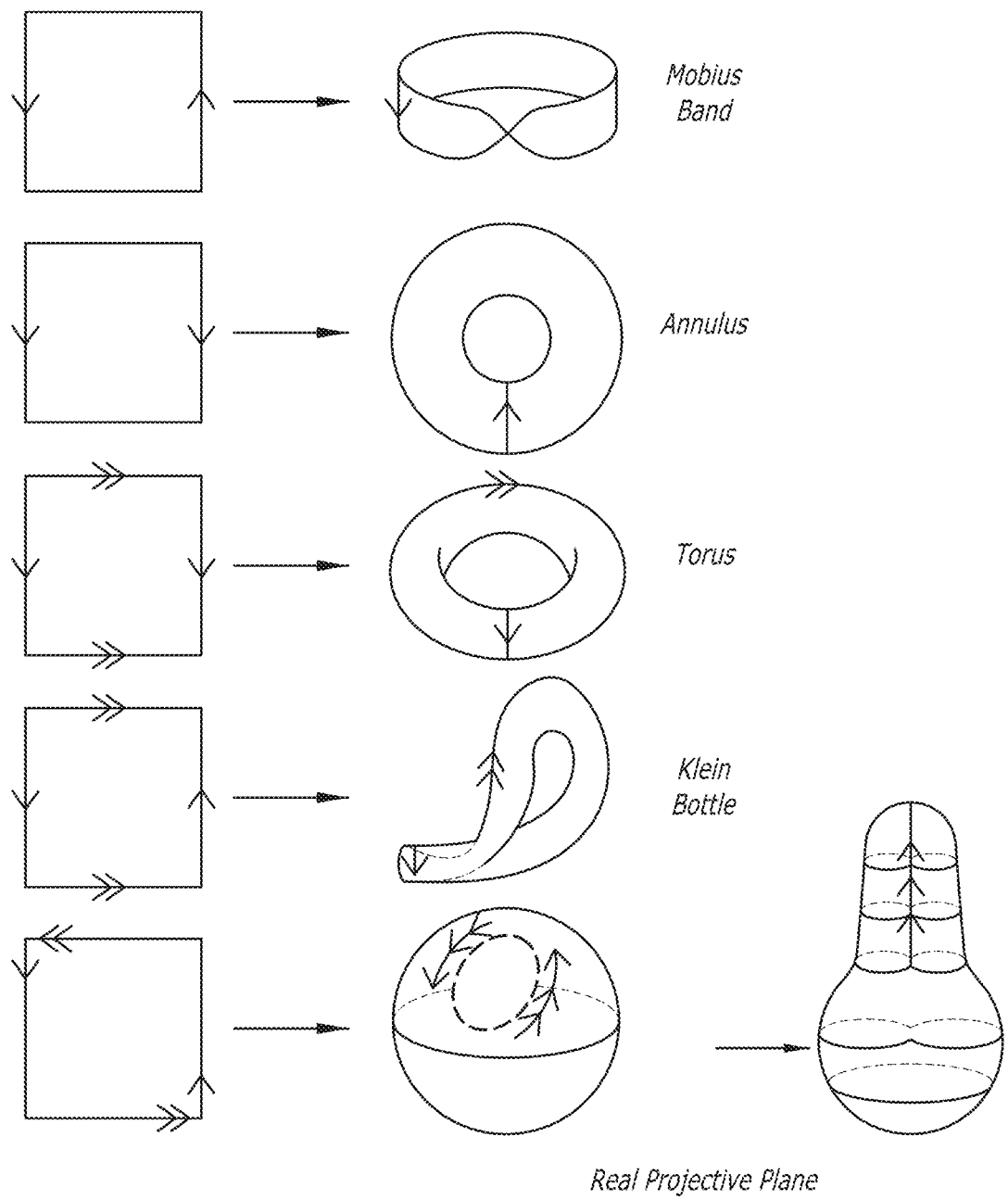
FIG. 3 is a schematic diagram showing five different topological surfaces.
Figure 4:
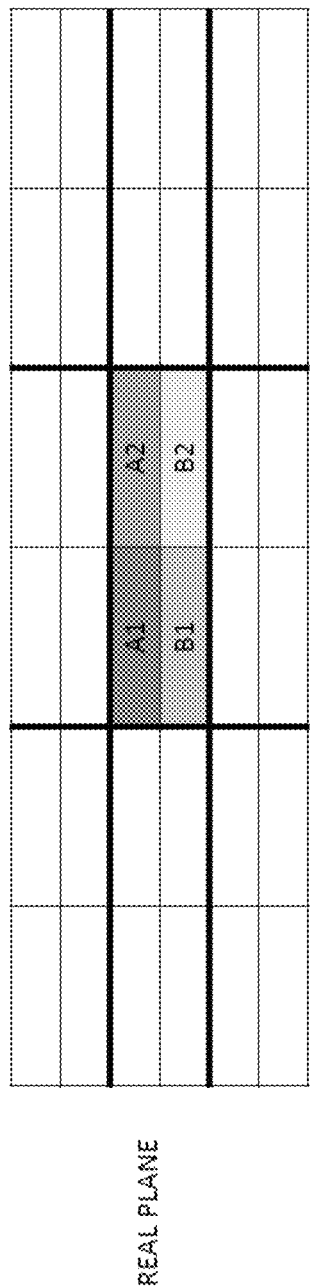
FIG. 4 is a diagram showing a grid of game spaces for forming a game surface of some embodiments.
Figure 5:
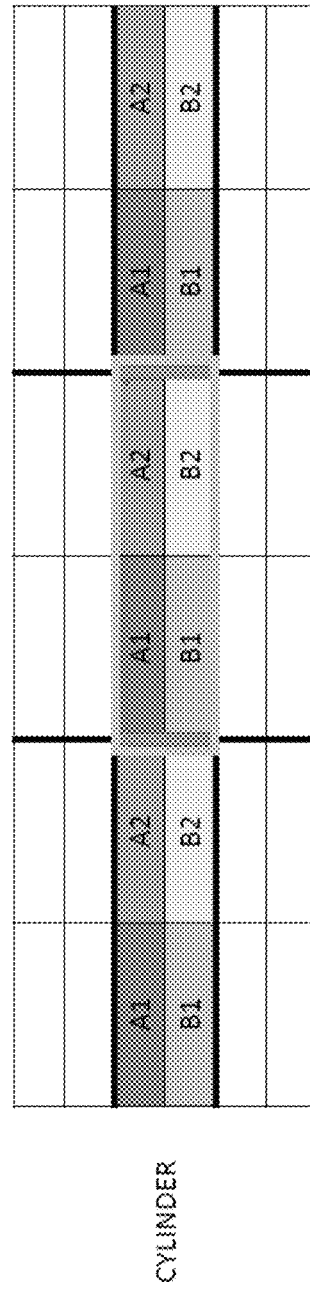
FIG. 5 is a diagram showing a grid of game spaces for forming a game surface of some embodiments.
Figure 6:
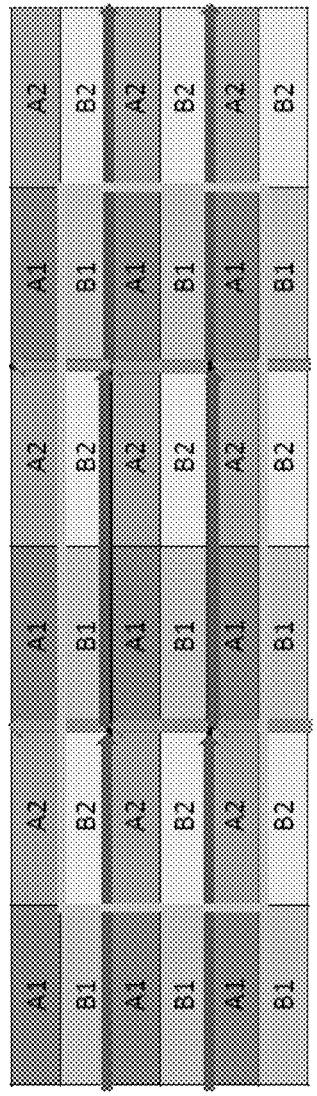
FIG. 6 is a diagram showing a grid of game spaces for forming a game surface of some embodiments.
Figure 7:
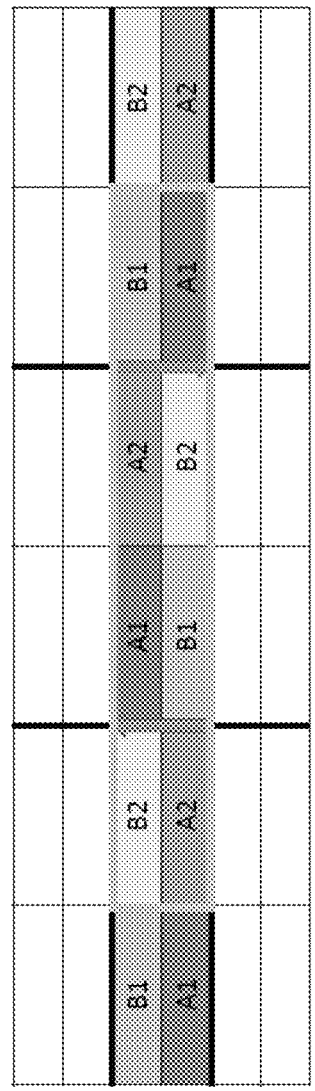
FIG. 7 is a diagram showing a grid of game spaces for forming a game surface of some embodiments.
Figure 8:
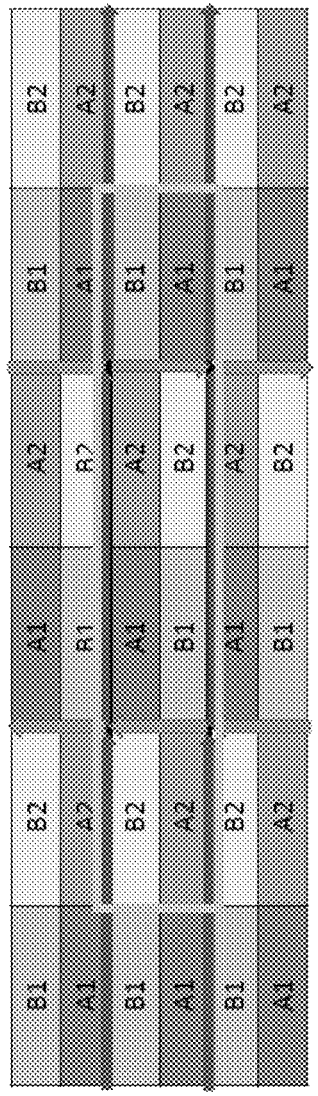
FIG. 8 is a diagram showing a grid of game spaces for forming a game surface of some embodiments.
Figure 9:
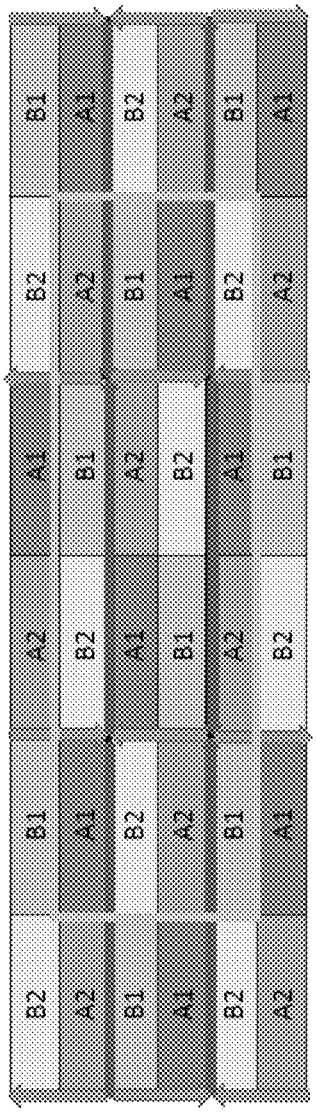
FIG. 9 is a diagram showing a grid of game spaces for forming a game surface of some embodiments.
Figure 10:
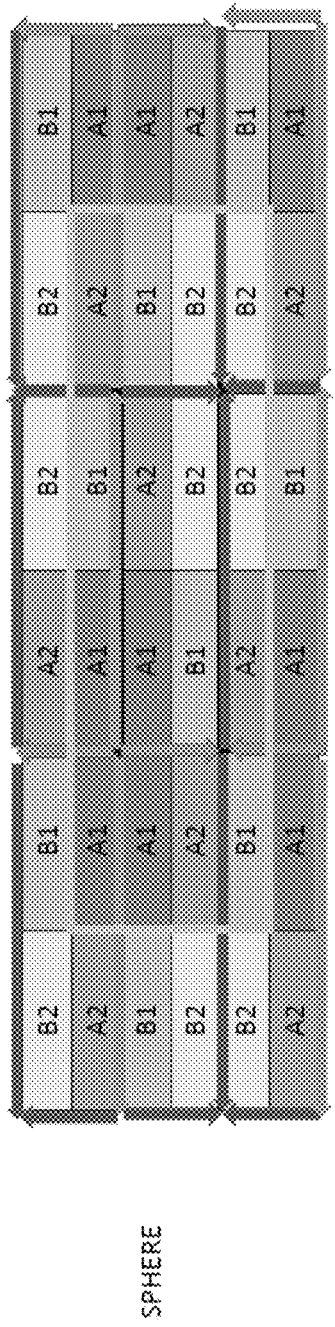
FIG. 10 is a diagram showing a grid of game spaces for forming a game surface of some embodiments.

Any fundamental polygon can be written symbolically using the notations A and B which represents the sides of a polygon having an even number of sides, such as each of the squares shown in FIG. 2. A polygon is written symbolically by beginning at any vertex of the polygon and proceeding around the perimeter of the polygon with −1 indicating an opposite direction to the direction of traversal around the polygon. For example:

Sphere: $ABB^{-1}A^{-1}$
Real projective plane: $ABAB$
Torus: $ABA^{-1}B^{-1}$
Klein bottle: $ABAB^{-1}$ The formation of five topological surfaces from rectangles using this notation is illustrated in FIG. 3.

Referring now to FIGS. 4-10 of the accompanying drawings, the fundamental polygons for respectively a real plane, cylinder, torus, moebius strip, Klein bottle, real projective plane and sphere are represented by plotting the travel along the sides of a fundamental polygon across a grid. Each of the squares of the grid represents a game space of the game surface when the game surface is generated based on the grid. In some embodiments, the central grid made of spaces A1, A2, B1, B2 is the basis or main board, all other grids are replica of this main board, with possibly some symmetry or rotation or mirroring illustrated by the position of the name and colors of their cells FIG. 11 shows a further variant in which two mirror edges are plotted in the grid such that the game space in a central portion 7 are mirrored in two adjacent portions 8, 9 on either side of the central portion 7.

Figure 11:
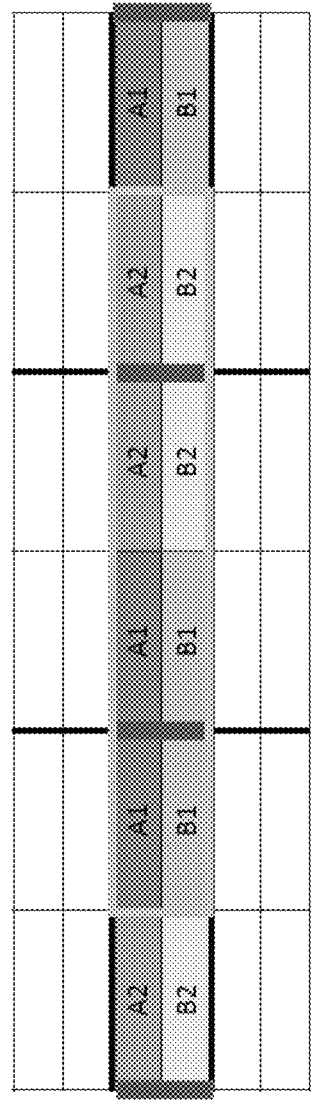
FIG. 11 is a diagram showing a grid of game spaces for forming a game surface of some embodiments.
Figure 12:
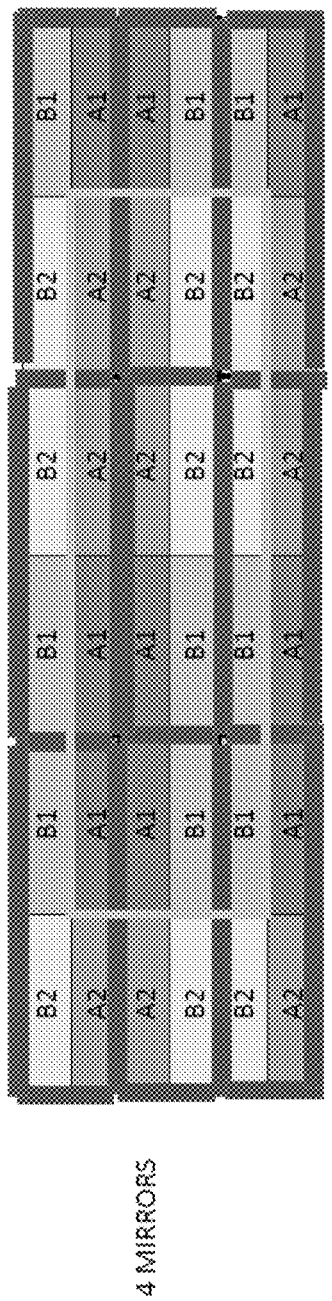
FIG. 12 is a diagram showing a grid of game spaces for forming a game surface of some embodiments.
Figure 13:
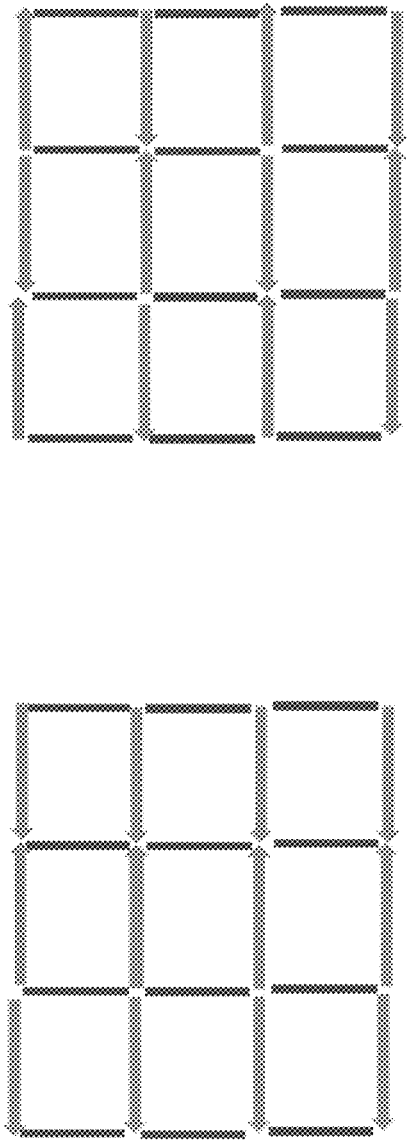
FIG. 13 is a diagram showing the movement across the grid of FIG. 12.

Referring to FIGS. 11 and 12, a further variant comprises four mirror edges which are provided along four intersecting lines 10, 13.

Figure 14:
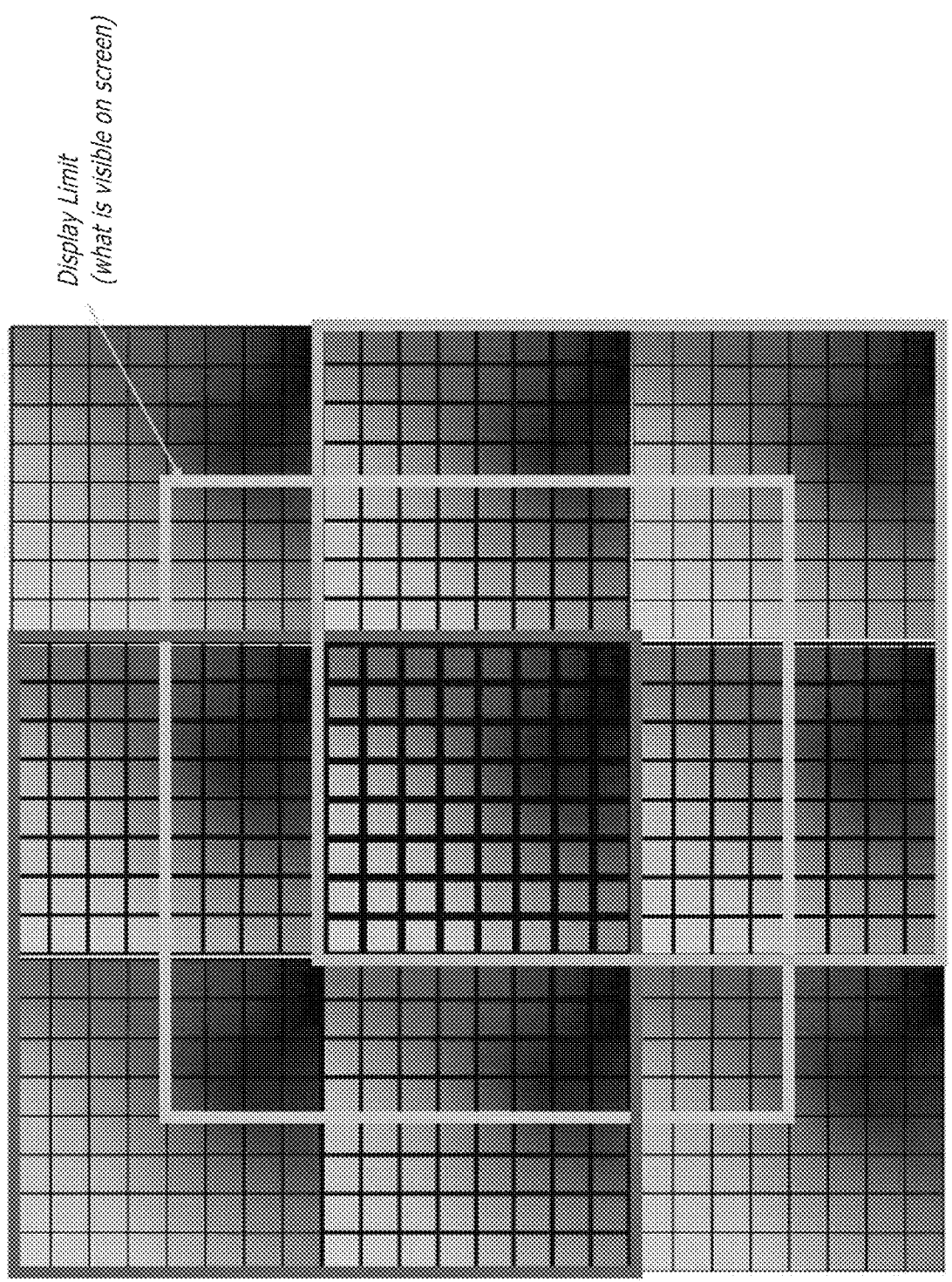
FIG. 14 is a diagram showing a grid of game spaces for simulating an infinite game surface of some embodiments.
Figure 15:
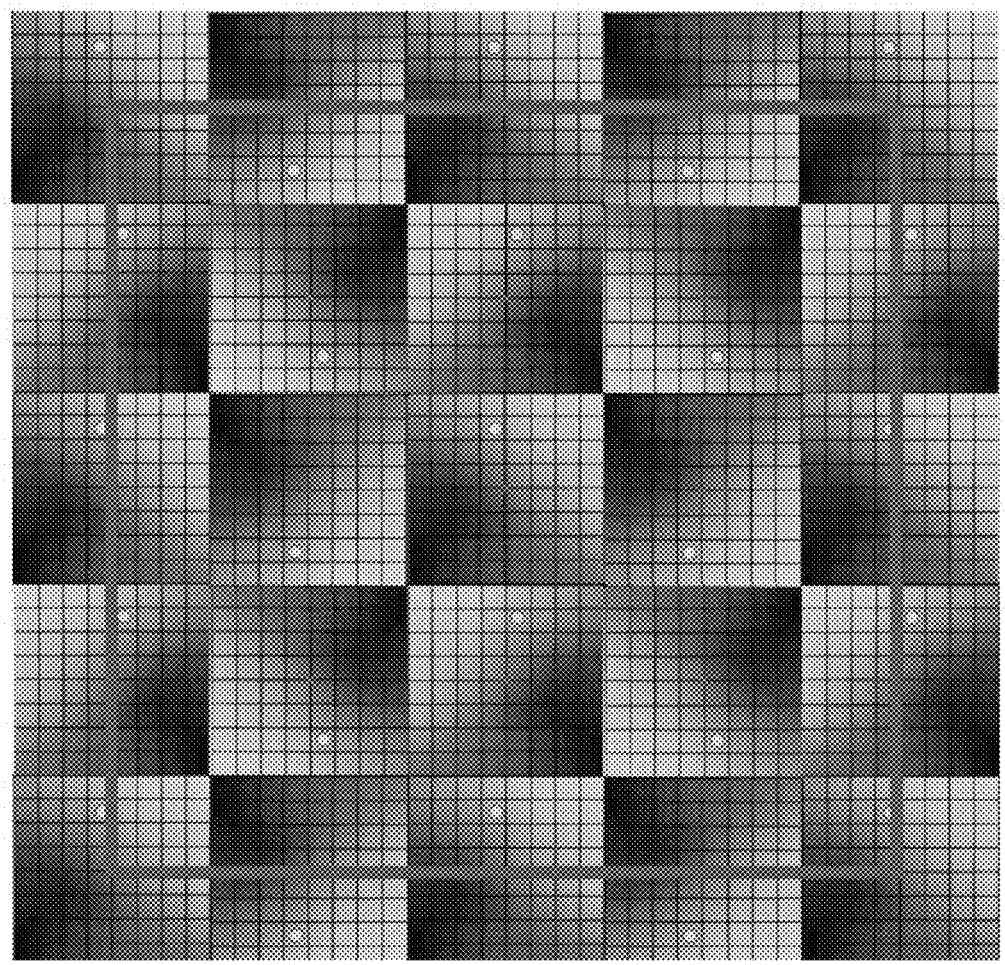
FIG. 15 is a diagram showing a grid of game spaces for simulating an infinite game surface of some embodiments.

Referring now to FIG. 14, a game system of some embodiments is configured to simulate an infinite game surface by extending the game surface beyond a display limit (i.e. what is visible on a screen viewed by a user). This represents a plurality of tiled game surfaces. For instance, a matrix of 5×5 game surfaces comprising a total of 25 boards is shown in FIG. 15. In the example shown in FIG. 15, a game is played by placing 25 pieces across the extended game surface (instead of playing only one piece), with one piece on each of the boards.

The game system of some embodiments is independent of the game which is played on the game surface. Any board game which is played using a board which is divided into game spaces can be played using the game system of some embodiments. The game surface which is generated by the game surface generator module 5 extends a conventional board by "opening" at least one edge of the board so that the edge provides a link to an adjacent board or to a mirror which reflects the existing board.

Figure 16:
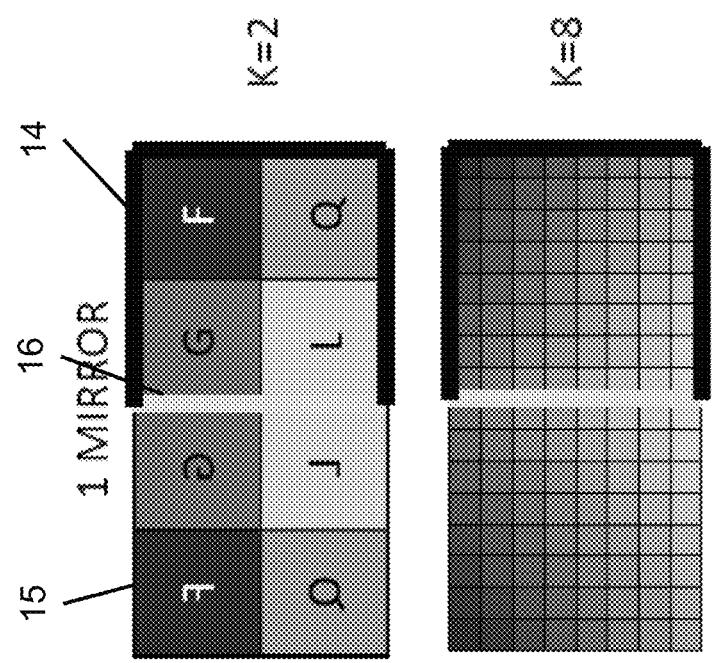
FIG. 16 is a diagram showing a grid of game spaces for forming a game surface of some embodiments.

FIG. 16 shows an example of a one edge mirror in which a base board 14 is reflected on to an additional board 15 which is coupled to the base board 14 by a mirror edge 16. The additional board 15 is connected to the base board 14 with a continuous bijective mapping. That is to say that, the set of grid for an infinite board, but only the central/base/main board is played, pieces are controlled on the central board, but their position is "propagated" or duplicated on all other possibly infinite boards automatically, and following the bijective mapping (one to one connection) which exist between the central main board and each of the other adjacent or distant (replica) board. This simulates movement on a surface with non-standard topology but moving pieces only on the central board as on a standard board game.

In the example shown in FIG. 16, the rules of the game defined on the base board 14 are played on the extended board 15 with the positions of pieces located on the base board 14 being replicated on the additional board 15. In this example, the base board 14 forms a visible portion of the game surface, whereas the additional board 15 forms a non-visible portion of the game surface. The mirrored additional board 15 allows the system to emulate an application of the rules of the game being played on the base board 14 as if the game is occurring in a more complex topology defined by the edges of the base board 14.

Figure 17:
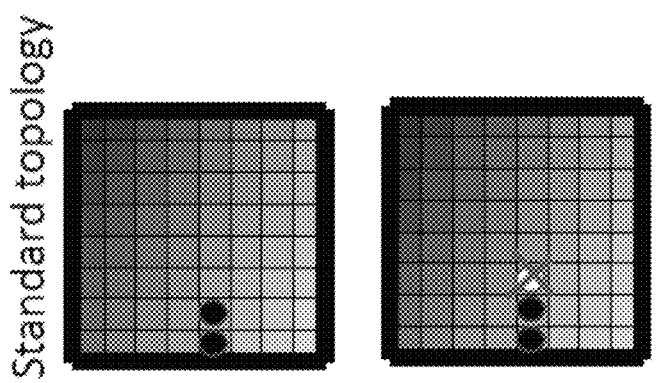
FIG. 17 is a diagram showing a standard topology board.

FIG. 17 shows an example of othello being played on a conventional board with standard topology where the edges of the board are closed by "walls". In this example, the rules of othello forbid a white piece from being played when the placing of the white piece does not flip any of the black pieces.

Figure 18:
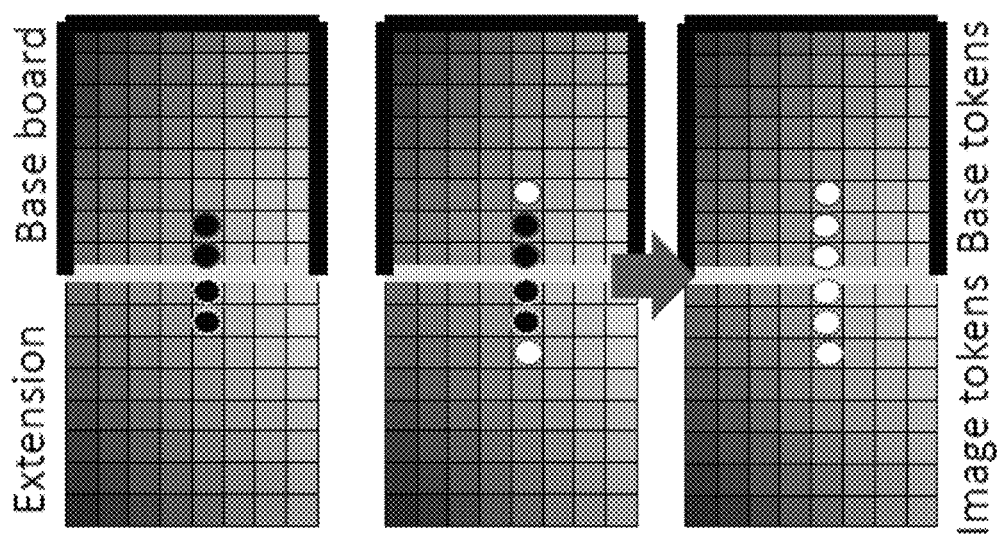
FIG. 18 is a diagram showing an example of a board of some embodiments.

By contrast, FIG. 18 shows an othello game being played on a game surface of some embodiments in which one edge of the base board 14 is opened with a mirror edge 16 so that the pieces on the base board 14 are mirrored on to the additional board 15. In this example, a white piece can be played to trap black pieces which are adjacent to the mirror edge 16 because the mirror edge 16 reflects the black pieces and the newly-placed white piece on the additional board 15 such that the trapped black pieces can be turned to white.

Figure 19:
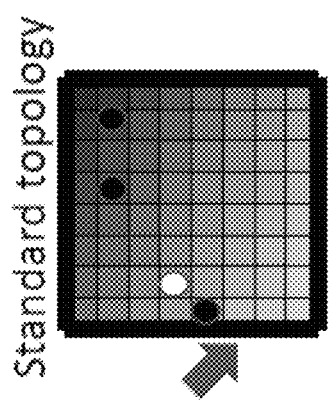
FIG. 19 is a diagram showing a standard topology board.
Figure 20:
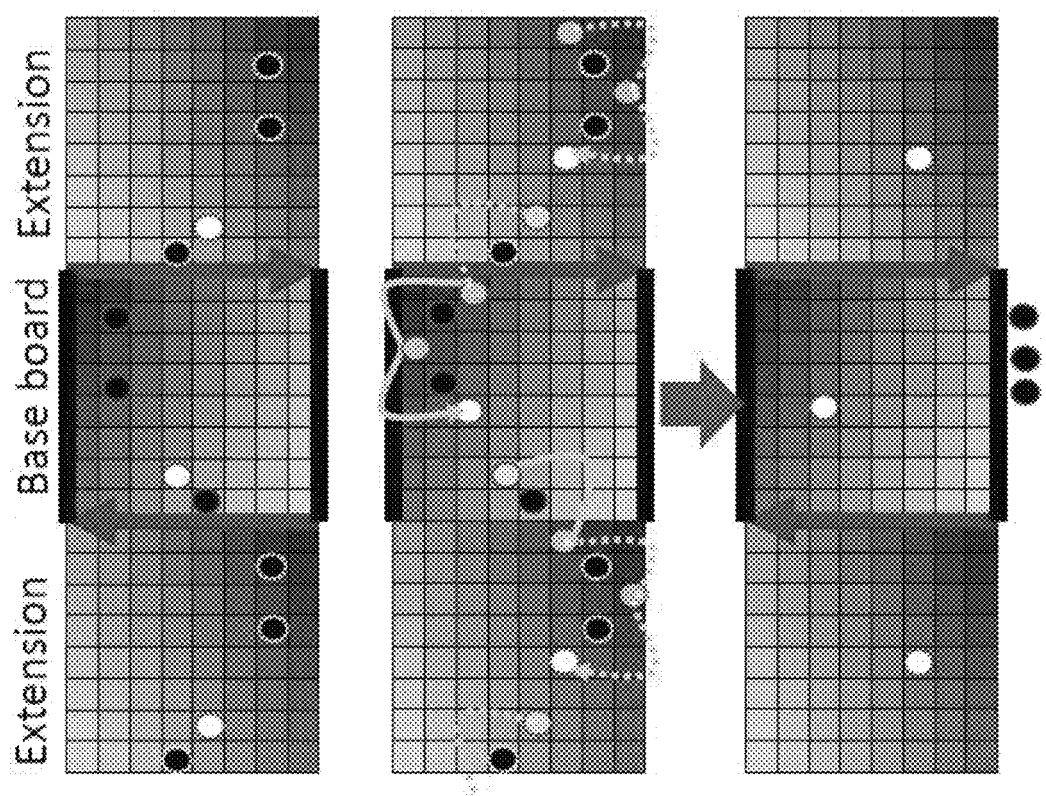
FIG. 20 is a diagram showing an example of a board of some embodiments.
Figure 22:
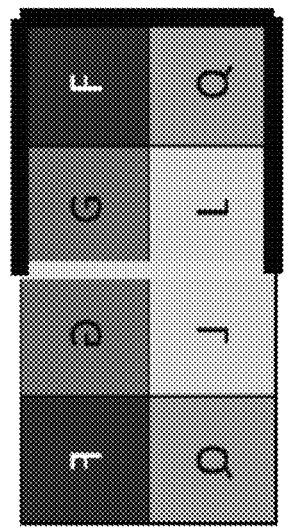
FIG. 22 is a diagram showing a grid of game spaces for forming a game surface of some embodiments.
Figure 21:
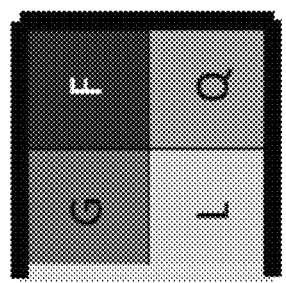
FIG. 21 is a diagram showing a grid of game spaces for forming a game surface of some embodiments.
Figure 24:
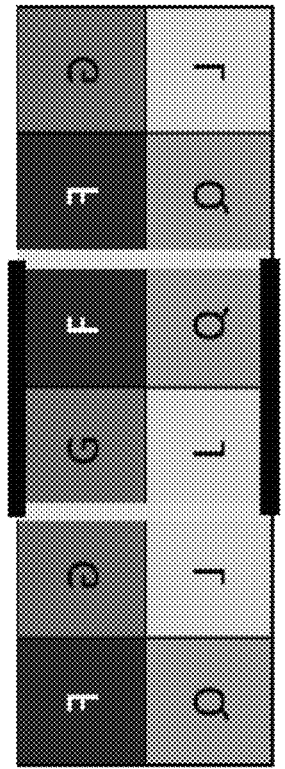
FIG. 24 is a diagram showing a grid of game spaces for forming a game surface of some embodiments.
Figure 23:
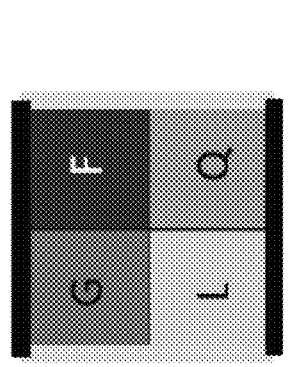
FIG. 23 is a diagram showing a grid of game spaces for forming a game surface of some embodiments.
Figure 26:
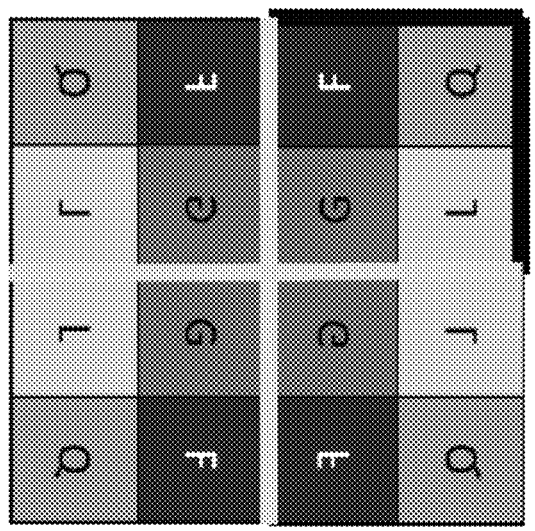
FIG. 26 is a diagram showing a grid of game spaces for forming a game surface of some embodiments.
Figure 25:
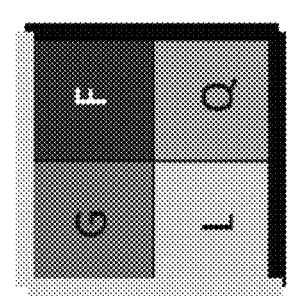
FIG. 25 is a diagram showing a grid of game spaces for forming a game surface of some embodiments.
Figure 28:
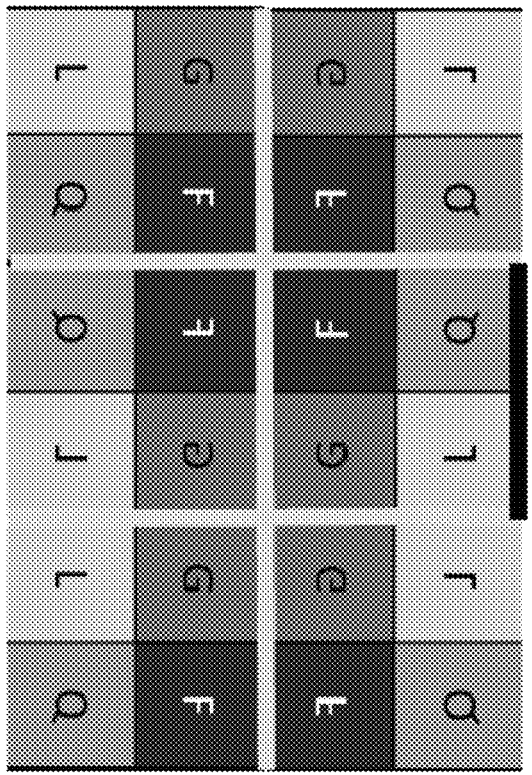
FIG. 28 is a diagram showing a grid of game spaces for forming a game surface of some embodiments.
Figure 27:
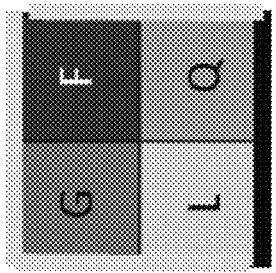
FIG. 27 is a diagram showing a grid of game spaces for forming a game surface of some embodiments.
Figure 29:
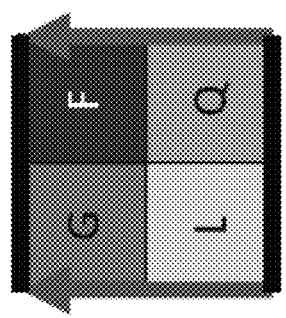
FIG. 29 is a diagram showing a grid of game spaces for forming a game surface of some embodiments.
Figure 30:
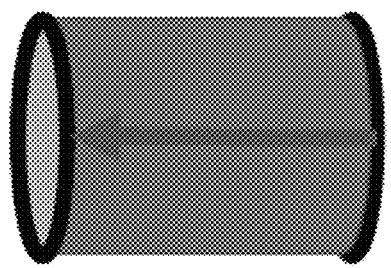
FIG. 30 is a diagram showing a game surface of some embodiments.
Figure 31:
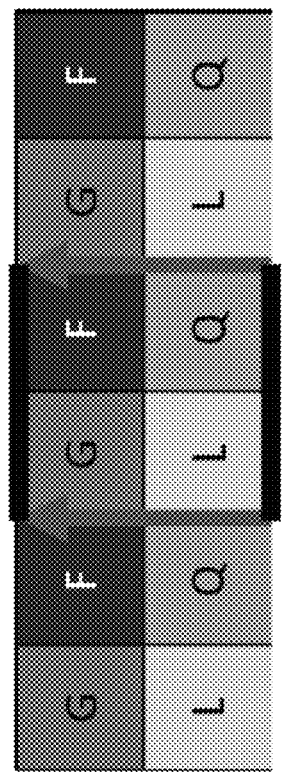
FIG. 31 is a diagram showing a grid of game spaces for forming a game surface of some embodiments.
Figure 32:
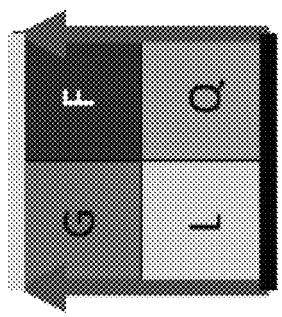
FIG. 32 is a diagram showing a grid of game spaces for forming a game surface of some embodiments.
Figure 33:
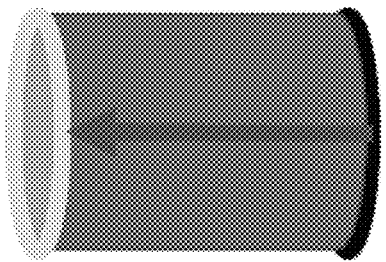
FIG. 33 is a diagram showing a game surface of some embodiments.
Figure 34:
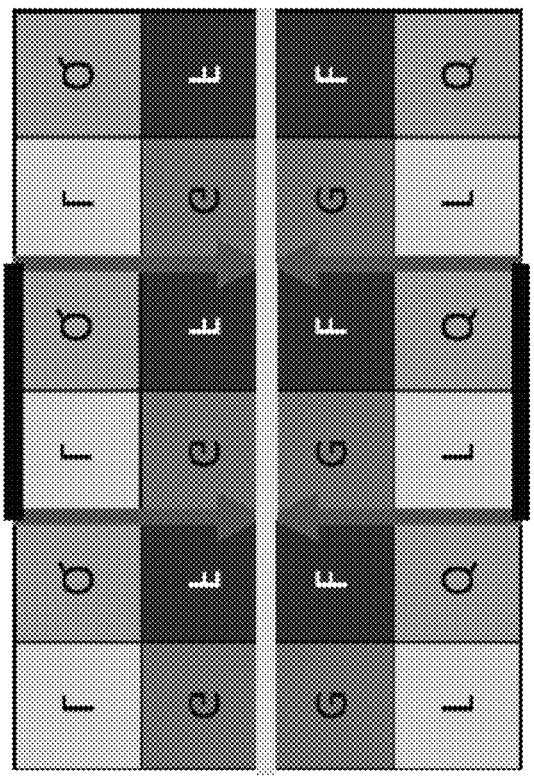
FIG. 34 is a diagram showing a grid of game spaces for forming a game surface of some embodiments.
Figure 36:
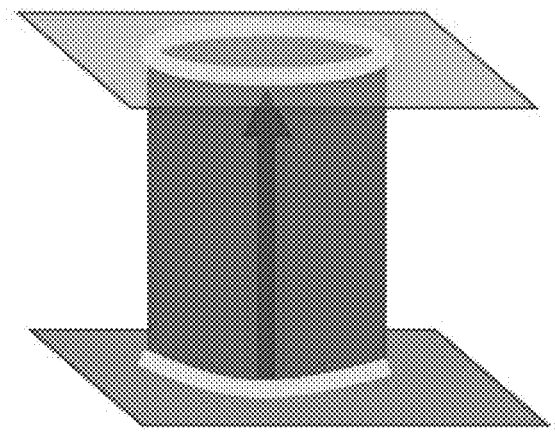
FIG. 36 is a diagram showing a game surface of some embodiments.
Figure 35:
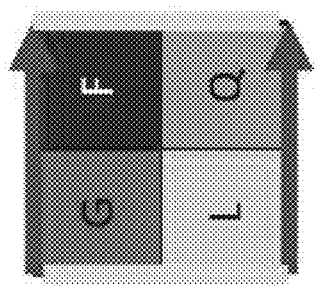
FIG. 35 is a diagram showing a grid of game spaces for forming a game surface of some embodiments.
Figure 37:
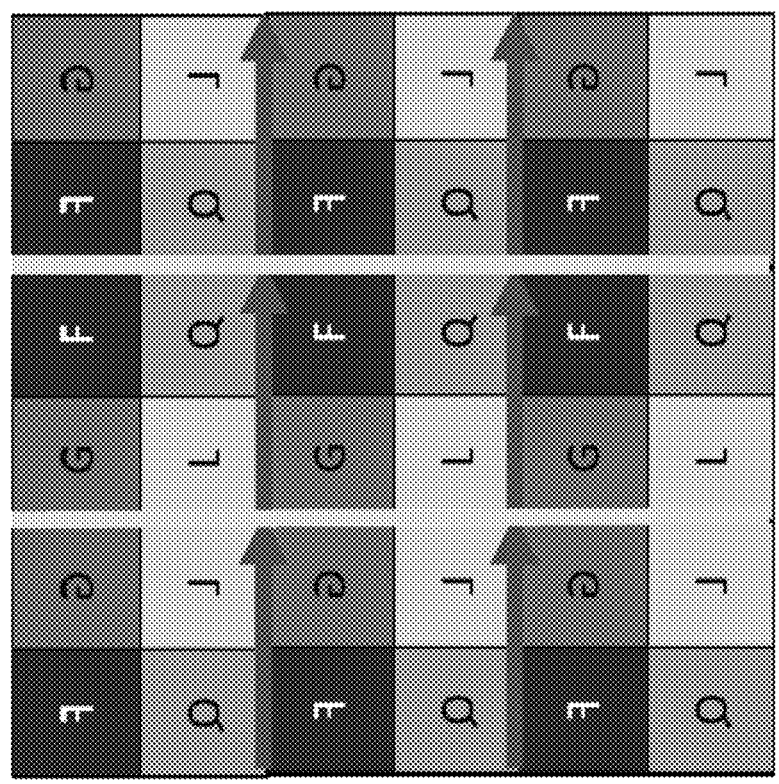
FIG. 37 is a diagram showing a grid of game spaces for forming a game surface of some embodiments.
Figure 38:
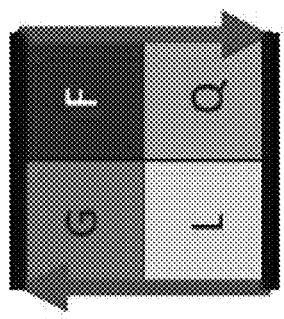
FIG. 38 is a diagram showing a grid of game spaces for forming a game surface of some embodiments.
Figure 39:
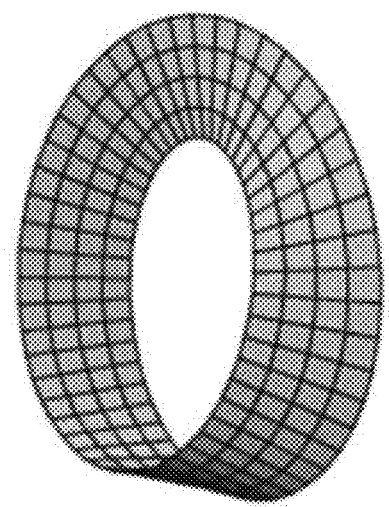
FIG. 39 is a diagram showing a game surface of some embodiments.
Figure 40:
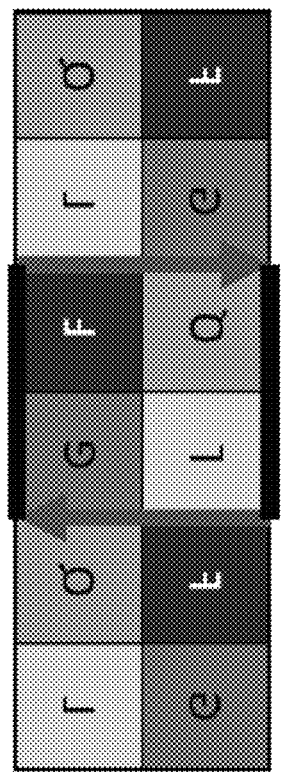
FIG. 40 is a diagram showing a grid of game spaces for forming a game surface of some embodiments.
Figure 41:
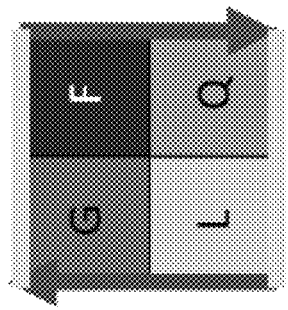
FIG. 41 is a diagram showing a grid of game spaces for forming a game surface of some embodiments.
Figure 42:
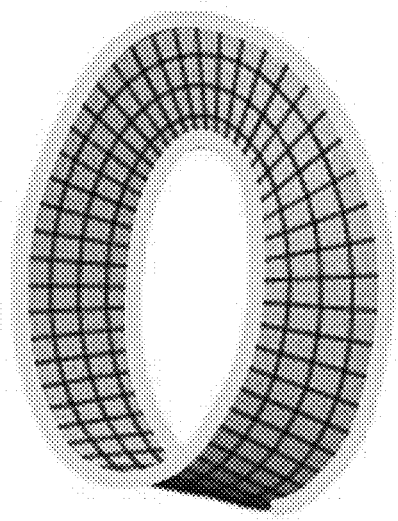
FIG. 42 is a diagram showing a game surface of some embodiments.
Figure 43:
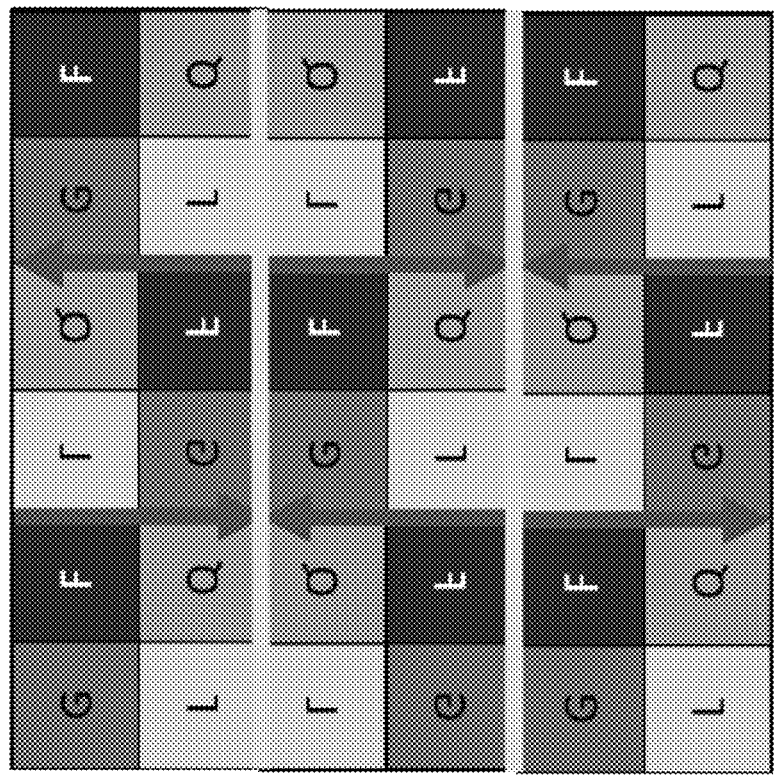
FIG. 43 is a diagram showing a grid of game spaces for forming a game surface of some embodiments.
Figure 44:
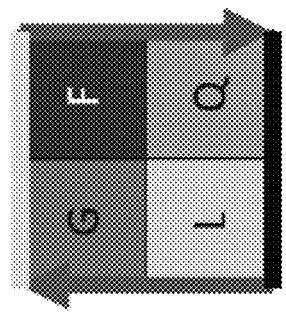
FIG. 44 is a diagram showing a grid of game spaces for forming a game surface of some embodiments.
Figure 45:
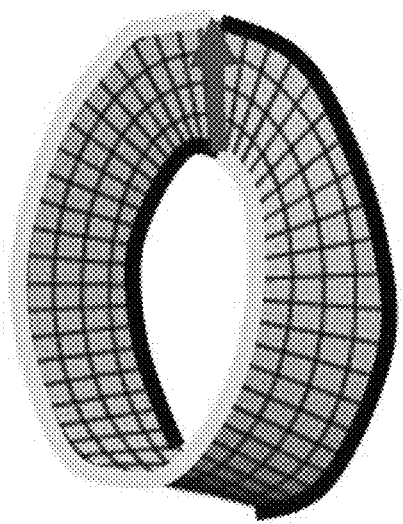
FIG. 45 is a diagram showing a game surface of some embodiments.
Figure 46:
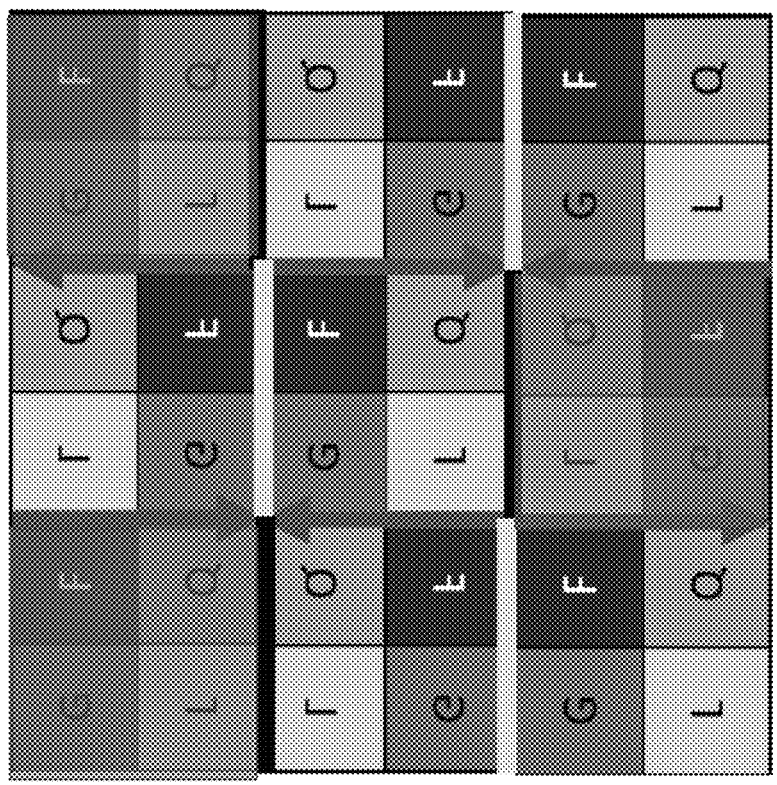
FIG. 46 is a diagram showing a grid of game spaces for forming a game surface of some embodiments.
Figure 47:
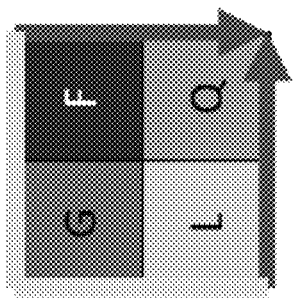
FIG. 47 is a diagram showing a grid of game spaces for forming a game surface of some embodiments.
Figure 48:
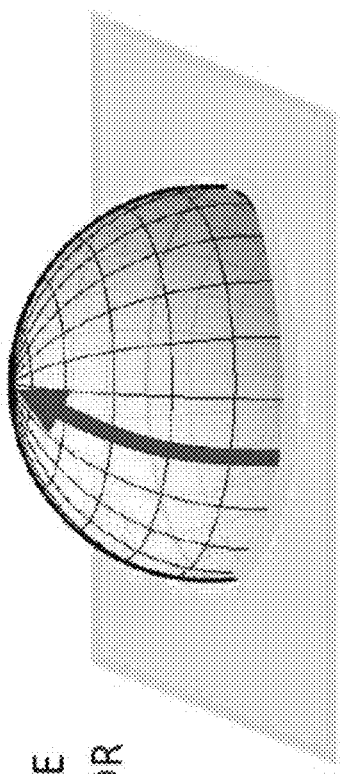
FIG. 48 is a diagram showing a game surface of some embodiments.
Figure 49:
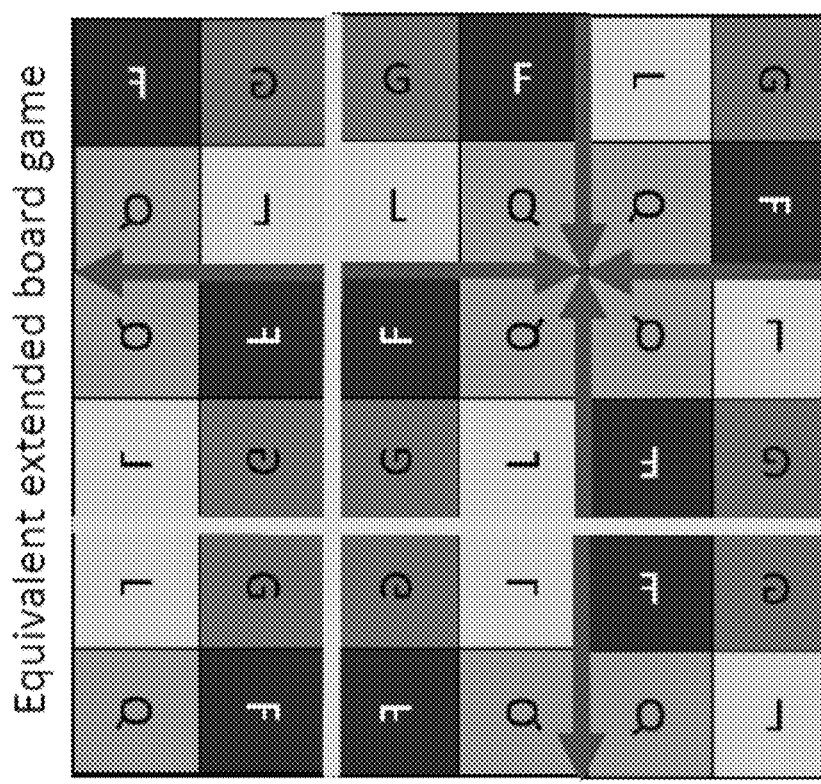
FIG. 49 is a diagram showing a grid of game spaces for forming a game surface of some embodiments.
Figure 50:
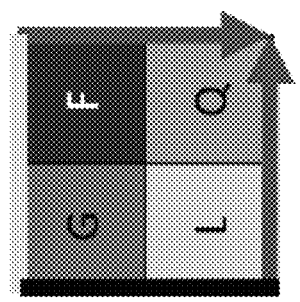
FIG. 50 is a diagram showing a grid of game spaces for forming a game surface of some embodiments.
Figure 51:
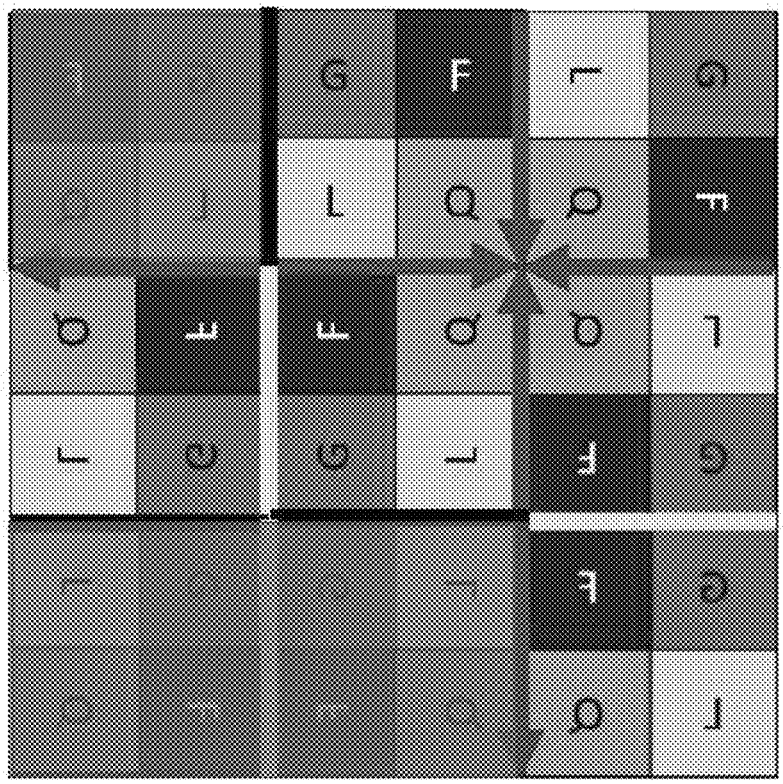
FIG. 51 is a diagram showing a grid of game spaces for forming a game surface of some embodiments.
Figure 52:
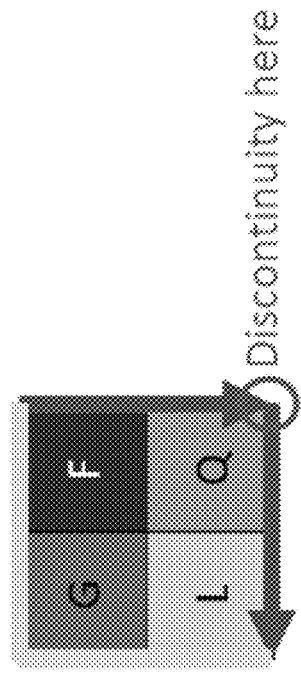
FIG. 52 is a diagram showing a grid of game spaces for forming a game surface of some embodiments.
Figure 53:
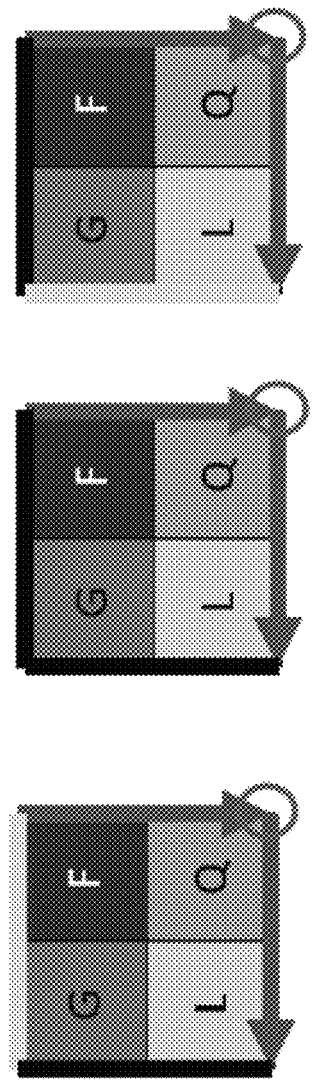
FIG. 53 is a diagram showing a grid of game spaces for forming a game surface of some embodiments.
Figure 54:
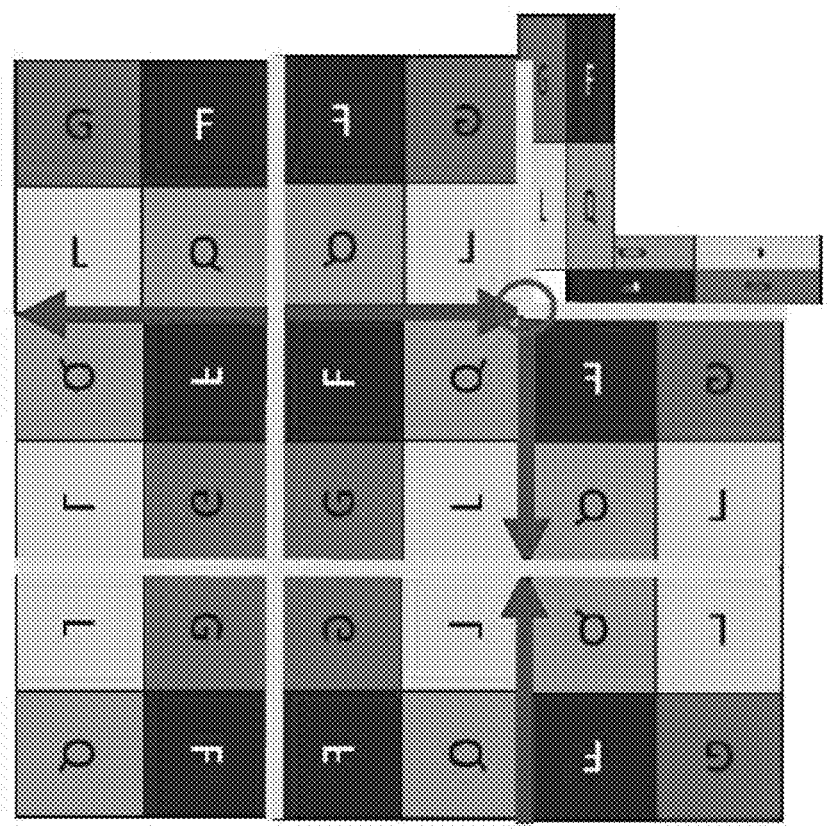
FIG. 54 is a diagram showing a grid of game spaces for forming a game surface of some embodiments.
Figure 55:
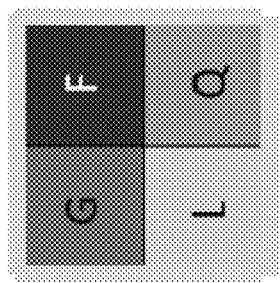
FIG. 55 is a diagram showing a grid of game spaces for forming a game surface of some embodiments.
Figure 56:
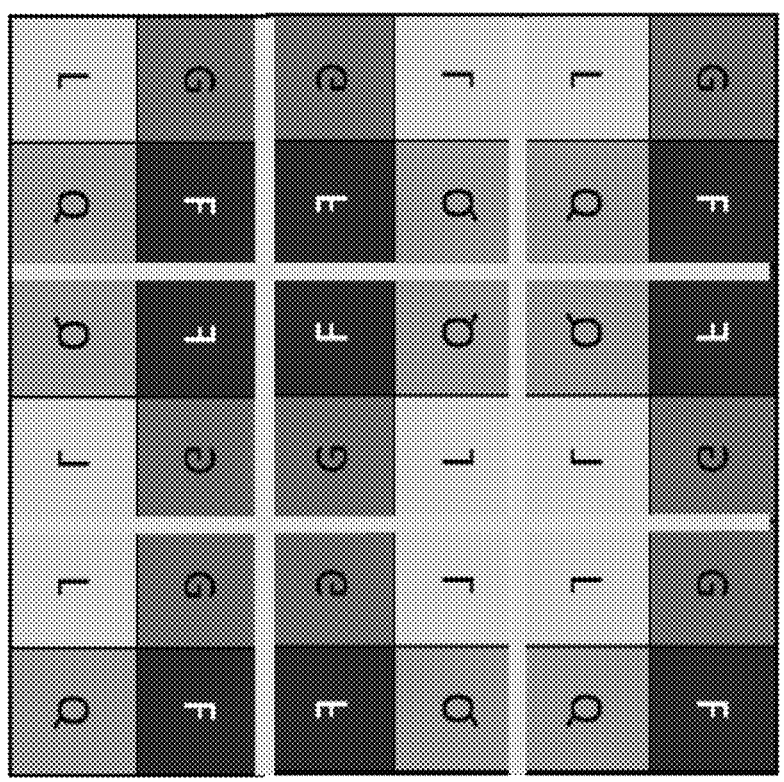
FIG. 56 is a diagram showing a grid of game spaces for forming a game surface of some embodiments.
Figure 57:
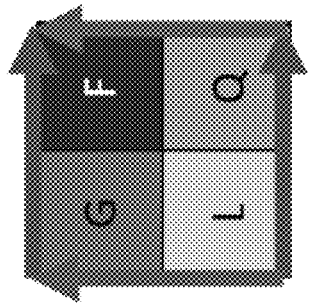
FIG. 57 is a diagram showing a grid of game spaces for forming a game surface of some embodiments.
Figure 58:
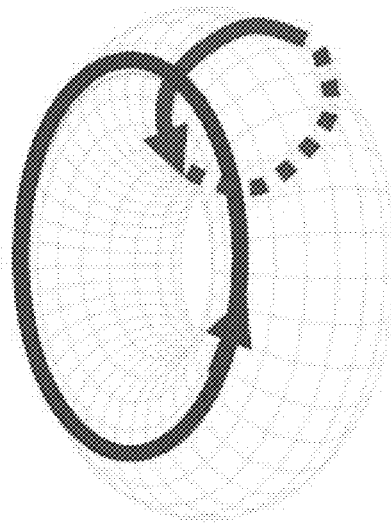
FIG. 58 is a diagram showing a game surface of some embodiments.
Figure 59:
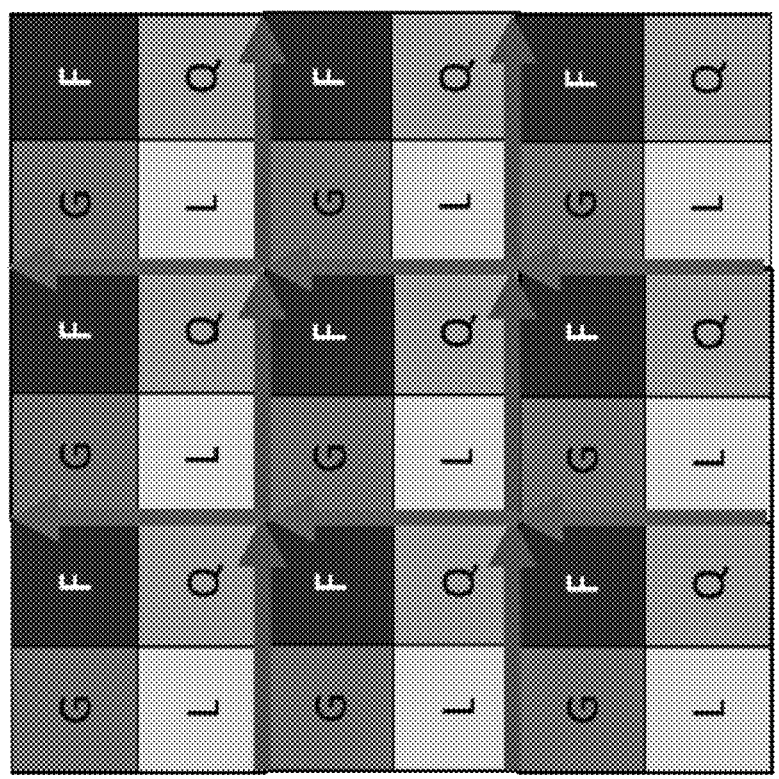
FIG. 59 is a diagram showing a grid of game spaces for forming a game surface of some embodiments.
Figure 60:
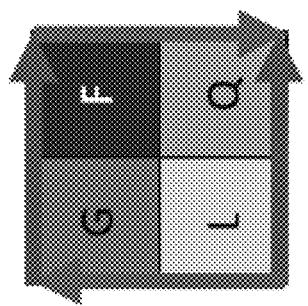
FIG. 60 is a diagram showing a grid of game spaces for forming a game surface of some embodiments.
Figure 61:
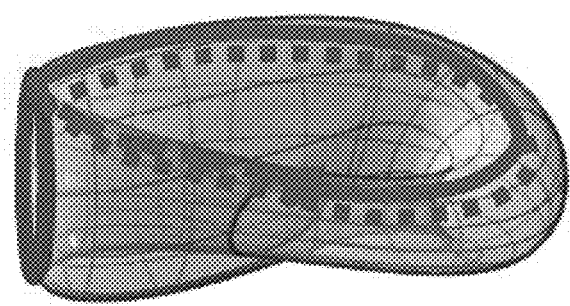
FIG. 61 is a diagram showing a game surface of some embodiments.
Figure 62:
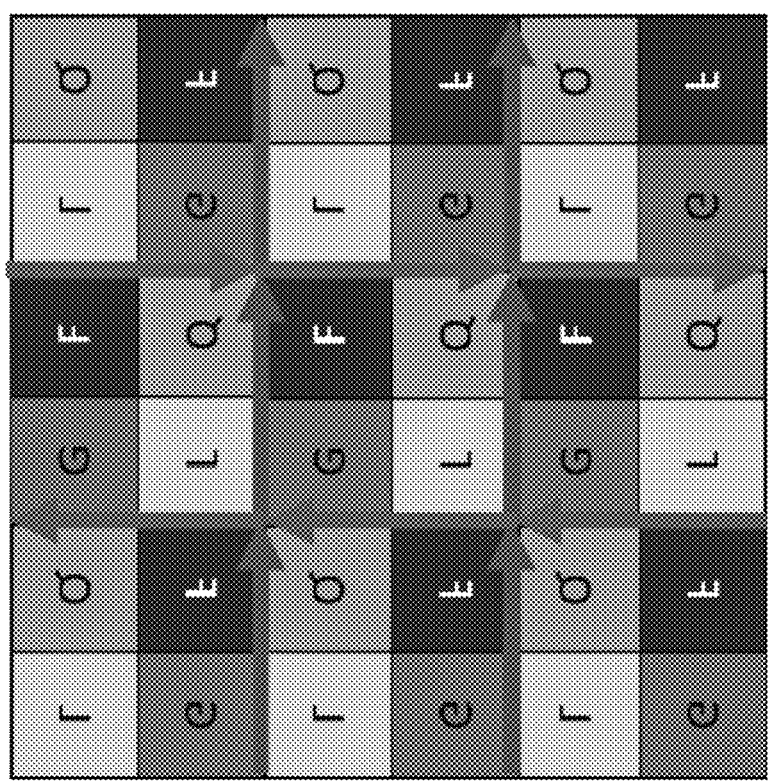
FIG. 62 is a diagram showing a grid of game spaces for forming a game surface of some embodiments.
Figure 63:
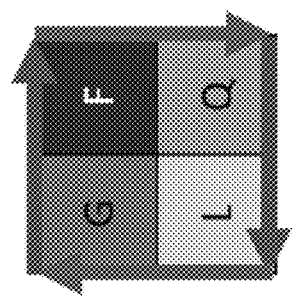
FIG. 63 is a diagram showing a grid of game spaces for forming a game surface of some embodiments.
Figure 64:
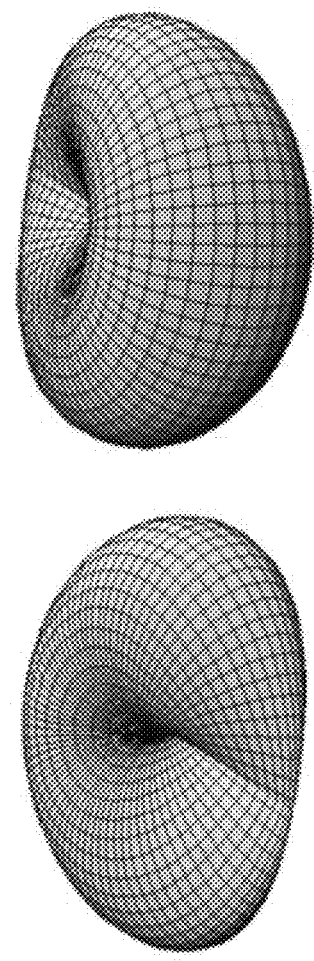
FIG. 64 is a diagram showing a game surface of some embodiments.
Figure 65:
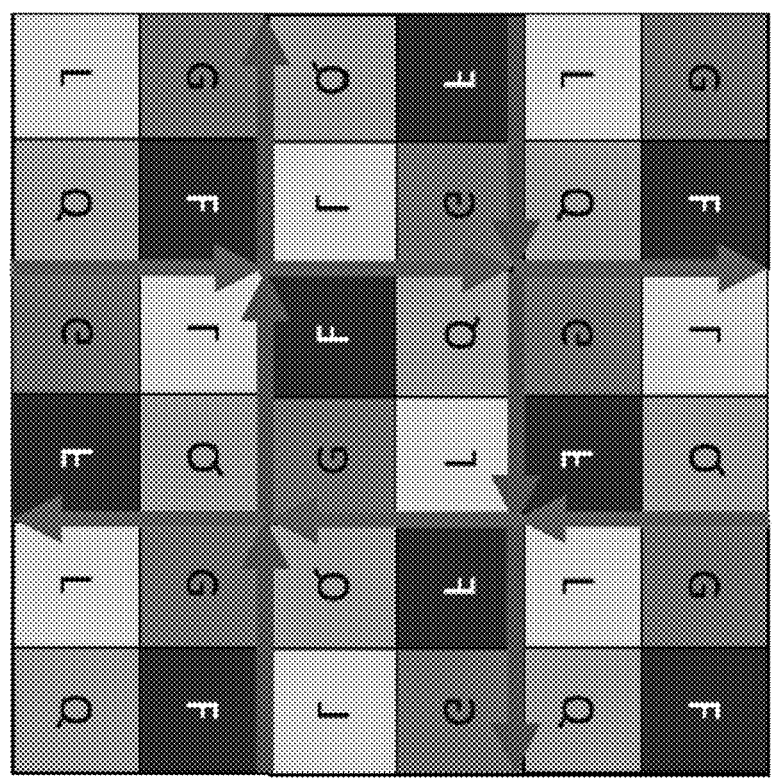
FIG. 65 is a diagram showing a grid of game spaces for forming a game surface of some embodiments.
Figure 66:
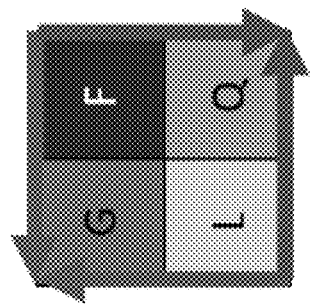
FIG. 66 is a diagram showing a grid of game spaces for forming a game surface of some embodiments.
Figure 67:
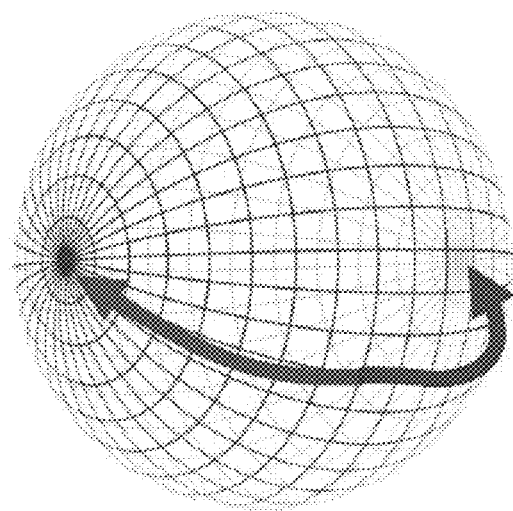
FIG. 67 is a diagram showing a game surface of some embodiments.
Figure 68:
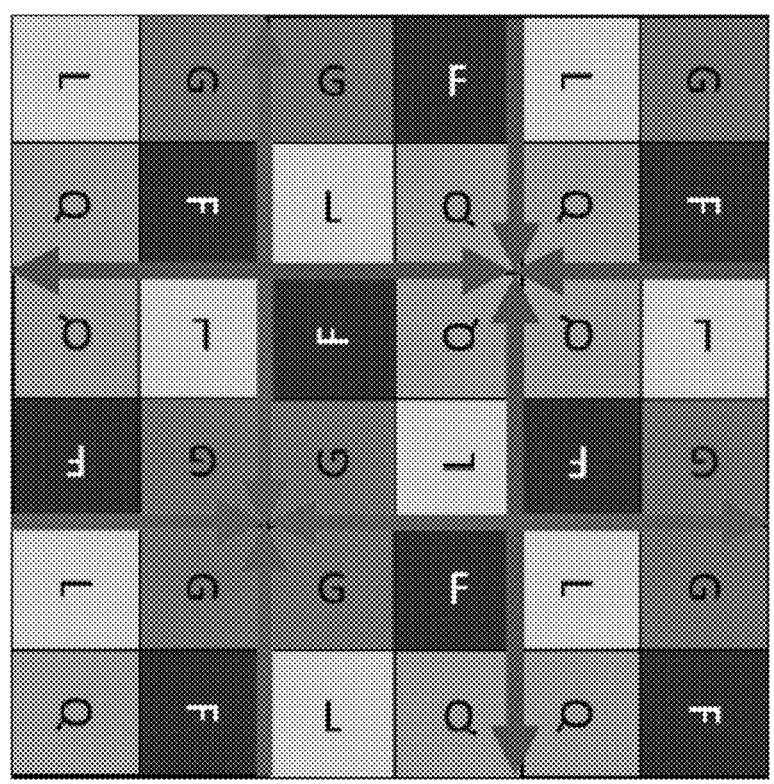
FIG. 68 is a diagram showing a grid of game spaces for forming a game surface of some embodiments.

Another example is illustrated in FIGS. 19 and 20 with a checker game being played with a moebius strip topology game surface.

FIG. 19 shows a standard topology board in which white cannot take black as no free spaces are available since the black piece is at the edge of the board. In addition, the two additional black pieces are too far away from the white piece on the board to be taken.

FIG. 20 shows the same example, but with the pieces on a game surface of some embodiments with the game surface being in a moebius strip shape and connected on two sides with a twist. In this example, the base board 14 is coupled to a further additional board 17. FIG. 20 shows how placing a single white piece can take all of the black pieces since the board is connected on two sides with a twist. In order to realise this possibility, a user must use abstract thinking to visualise the two additional boards 15, 17 (not shown).

FIGS. 21-68 of the accompanying drawings illustrate further embodiments with game surfaces having different three-dimensional shapes where the entirety of the game surface may be available for game-play and from any one perspective only a portion of the game surface is visible. In these embodiments, there is continuity between the visible portion and the non-visible portion such that the game surface continues across the game surface. In the embodiments having a mirror edge, the additional board or boards form the non-visible portions of the game surface.

Figure 69:
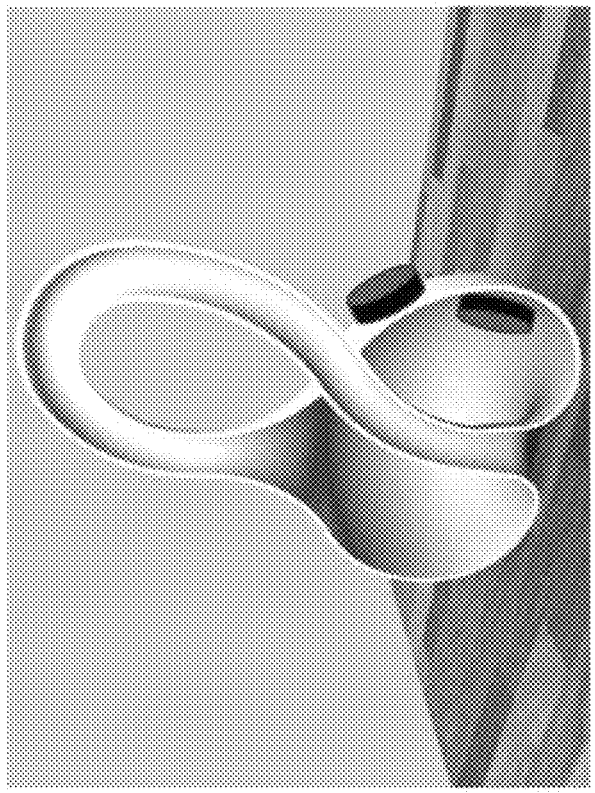
FIG. 69 is a diagram showing a game surface of some embodiments.

FIG. 69 shows a cross-section of a Klein bottle game surface with two game pieces. A physical embodiment having this Klein bottle shaped game surface would be configured to allow pieces to be placed on the interior face of the Klein bottle surface. The physical embodiment is configured to enable the game pieces to stay in place on the game surface using a releasable attachment, such as a magnet, pin, hole or adhesive material.

Figure 70:
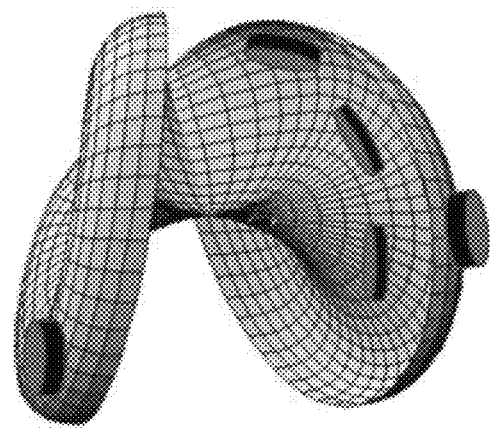
FIG. 70 is a diagram showing a game surface of some embodiments.
Figure 70:
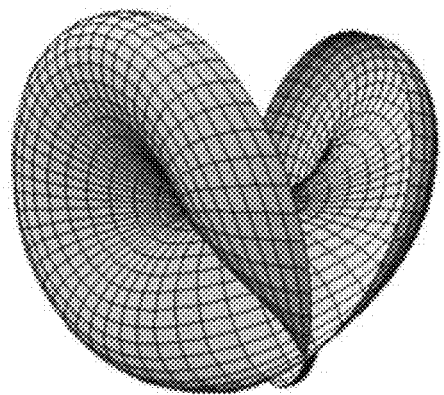

FIG. 70 shows an example of a projective plane being opened to allow access to its interior, with game pieces being placed on both the interior and exterior of the game surface.

Figure 72:
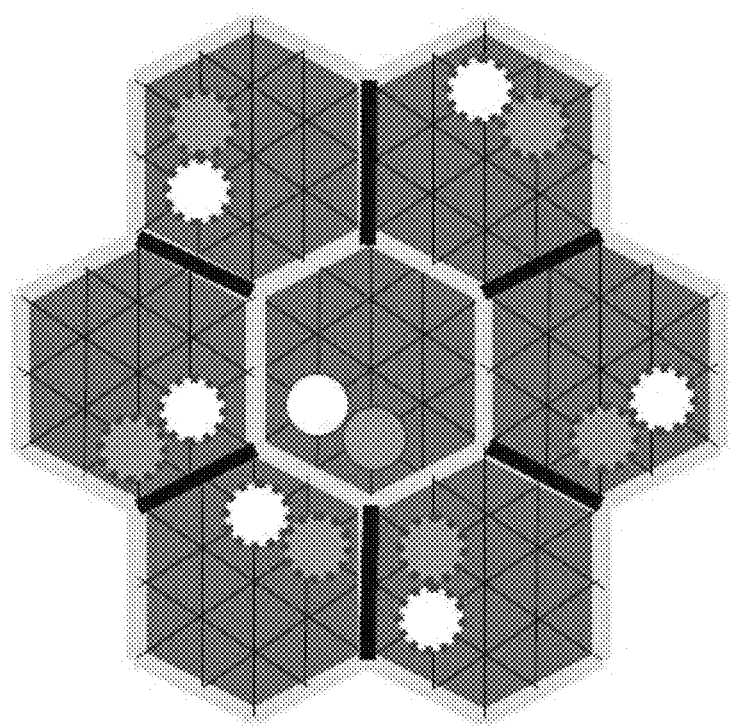
FIG. 72 is a diagram showing a game surface of some embodiments.
Figure 71:
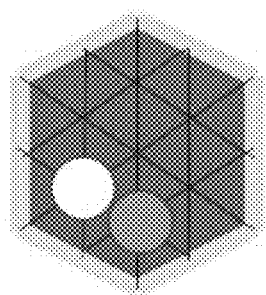
FIG. 71 is a diagram showing a game surface of some embodiments.

FIG. 71 shows an example of a hexagonal baseboard and FIG. 72 shows an example of the hexagonal base board being extended by six mirror edges to additional boards to illustrate that the concept of some embodiments may be applied to boards of any shape or size.

In some embodiments, the game surface is at least part of a topological closed surface selected from a group including a cylinder, a sphere, a torus, a moebius strip, a Klein bottle or a real projective plane.

In some embodiments, the game surface generator is configured to generate the game surface in a four-dimensional space such that the visible portion of the game surface in three dimensions varies over time.

In some embodiments, the game surface has an edge which couples part of the visible portion with part of the non-visible portion, and wherein the parts of the visible portion and the non-visible portion on either side of the edge mirror one another.

In some embodiments, the game system is for playing a board game selected from a group including othello, checkers, Chinese checkers or chess.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as a hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A game system for teaching a user to implement abstract thinking to play a game, the game system comprising:
 a graphical user interface providing an output to be displayed to the user, the output including a visible portion of a game surface for playing the game, the game surface including the visible portion and a non-visible portion, wherein the system receives input commands from the user via the graphical user interface to play the game;
 a display providing the graphical user interface output from the graphical user interface to the user, the graphical user interface output includes the visible portion of the game surface viewable by the user on the display and excludes the non-visible portion of the game surface;
 a game surface generator comprising a processor and a non-transitory computer readable memory, the memory storing executable instructions which, when executed by the processor, cause the processor to perform a plurality of functions of the game surface generator, wherein the game surface generator generates the game surface by generating and connecting a plurality of polygons to form a topological surface for playing the game in accordance with rules of the game, the game surface having:
  a primary game surface having a conventional topology of a standard game board with a first edge, the primary game surface being output from the graphical user interface and being the visible portion visible via the display; and
  an additional game surface having a topology different from the standard game board with a second edge, the topology of the additional game surface including at least one of a mirrored surface and a 3D-surface, the additional game surface being the non-visible portion that is not visible via the display, wherein the primary game surface and the additional game surface are each divided into a plurality of game spaces and the first edge of the visible primary game surface is coupled to the second edge of the non-visible additional game surface, there being a continuous bijective mapping between the primary game surface and the additional game surface such that the game surface continues past at least the first edge of the visible primary game surface to the non-visible additional game surface;
 a game piece controller comprising a processor and a non-transitory computer readable memory, the memory storing executable instructions which, when executed by the processor, cause the processor to perform a plurality of functions of the game piece controller, wherein the game piece controller;
  positions a plurality of game pieces on the primary game surface such that each game piece is positioned on a respective one of the plurality of game spaces of the primary game surface in accordance with the rules of the game and being visible via the display,
  propagates the positions of a plurality of additional game pieces on corresponding game spaces of the additional game surface automatically according to the rules of the game and the bijective mapping between the primary game surface and the additional game surface, there being at least one additional game piece corresponding to each of the game pieces on the primary game surface, the additional game pieces not being visible via the display,
  moves a selected visible game piece on the primary game surface to a different game space on the primary game surface in response to an input command including a movement signal provided by the user via the graphical user interface,
  moves, simultaneously with the move of the selected game piece on the primary game surface, at least one of the corresponding additional game pieces on the additional game surface to a corresponding different game space on the additional game surface non-visible via the display and any non-corresponding additional game pieces affected by the move of the selected game piece in accordance with the rules of the game, wherein the game piece controller simulates movement of the additional game pieces on the additional game surface by moving only the game pieces on the primary game surface, and
  emulates an application of the rules of the game being played on the visible primary game surface to the non-visible additional game surface to ensure that the move of the non-visible additional game pieces is allowable in accordance with the rules of the game or to ensure that at least another non-visible additional game piece has to be moved or removed in accordance with the rules of the game.

2. The game system of claim 1, wherein the system displays at least a portion of the additional game surface to the user.

3. The game system of claim 1, wherein the game surface generator generates a plurality of additional game surfaces which are coupled to the additional game surface and the primary game surface along a plurality of edges, wherein there is a bijective mapping between the primary game surface and each of the plurality of additional game surfaces.

4. The game system of claim 1, wherein the positions of the game pieces on the additional game surface mirror the positions of the game pieces on the primary game surface about the coupled edges of the primary and additional game surfaces.

5. The game system of claim 1, wherein the game system is for playing a board game selected from a group including Othello, checkers, Chinese checkers or chess.

6. A game system for teaching a user to implement abstract thinking to play a game, the game system comprising:
 a graphical user interface providing an output to be displayed to the user, the output including a visible portion of a game surface for playing the game, the game surface including the visible portion and a non-visible portion, wherein the system receives input commands from the user via the graphical user interface to play the game;
 a display providing the graphical user interface output from the graphical user interface to the user, the graphical user interface output including the visible portion of the game surface viewable by the user on the display and excludes the non-visible portion of the game surface;
 a game surface generator comprising a processor and a non-transitory, computer readable memory, the memory storing executable instructions which, when executed by the processor, cause the processor to perform a plurality of functions of the game surface generator, wherein the game surface generator is configured to generate the game surface by generating and connecting a plurality of polygons to form a topological surface for playing the game in accordance with rules of the game and to divide the game surface into an array of game spaces, wherein from any one perspective only a portion of the game surface is visible, the game surface having:

the visible portion being output from the graphical user interface and being visible via the display, the visible portion having a conventional topology of a standard game board; and the non-visible portion being non-visible via the display, the non-visible portion having a topology different from the standard game board, the topology of the non-visible portion including at least one of a mirrored surface and a 3D-surface, there being continuity between the visible portion of the game surface and the non-visible portion of the game surface such that the game surface continues past the visible portion of the game surface to the non-visible portion of the game surface and there being a continuous bijective mapping between the visible and non-visible portions of the game surface such that the game surface continues past at least the first edge of the visible portion of the game surface to the non-visible portion of the game surface;

a game piece controller comprising a processor and a non-transitory computer readable memory, the memory storing executable instructions which, when executed by the processor, cause the processor to perform a plurality of functions of the game piece controller, wherein the game piece controller:

positions a plurality of game pieces on the visible portion of the game surface such that each game piece is positioned on a respective one of the plurality of game spaces on the visible portion of the game surface in accordance with the rules of the game and being visible via the display, propagates the positions of a plurality of additional game pieces on corresponding game spaces of the non-visible portion of the game surface automatically according to the rules of the game and the bijective mapping between the visible portion of the game surface and the non-visible portion of the game surface, there being at least one additional game piece corresponding to each of the game pieces on the visible surface, the additional game pieces not being visible via the display, moves a selected visible game piece on the visible portion of the game surface to a different game space on the visible portion of the game surface in response to a movement input command including a movement signal provided by the user via the graphical user interface, moves, simultaneously with the move of the selected game piece on the visible portion of the game surface, at least one of the corresponding additional game pieces on the non-visible game surface to a corresponding different game space on the non-visible game surface and any non-corresponding additional game pieces affected by the move of the selected game piece in accordance with the rules of the game, wherein the game piece controller simulates movement of the additional game pieces on the non-visible portion of the game surface by moving only the game pieces on the visible portion of the game surface, and emulates an application of the rules of the game being played on the visible portion of the game surface to the non-visible portion of the game surface to ensure that the move of the non-visible additional game piece is allowable in accordance with the rules of the game or to ensure that at least another additional game piece has to be moved or removed in accordance with the rules of the game.

7. The game system of claim 6, wherein the game surface is a single surface.

8. The game system of claim 6, wherein each game space is a fundamental polygon of a plurality of fundamental polygons that are connected to one another to form the game surface.

9. The game system of claim 6, wherein the game surface is at least part of a topological closed surface selected from a group including a cylinder, a sphere, a torus, a moebius strip, a Klein bottle or a real projective plane.

10. The game system of claim 6, wherein the game surface generator generates the game surface in a four-dimensional space such that the visible portion of the game surface in three dimensions varies over time.

11. The game system of claim 6, wherein the game surface has an edge which couples part of the visible portion of the game surface with part of the non-visible portion of the game surface, and wherein the parts of the visible portion of the game surface and the non-visible portion of the game surface on either side of the edge mirror one another.

12. The game system of claim 6, wherein the game system is for playing a board game selected from a group including othello, checkers, Chinese checkers or chess.

13. A computer-implemented method for providing a board game and for teaching a user to implement abstract thinking to play the game, the method comprising:

providing a graphical user interface providing an output to be displayed to the user, the output including a visible portion of a game surface for playing the game, the game surface including the visible portion and a non-visible portion, wherein the user enters input commands via the graphical user interface to play the game;

displaying, via a display, the graphical user interface output from the graphical user interface to the user, the graphical user interface output including the visible portion of the game surface viewable by the user on the display and excludes the non-visible portion of the game surface;

generating, using a processor and a non-transitory computer readable memory, the memory storing executable instructions which, when executed by the processor, cause the processor to generate the game surface by generating and connecting a plurality of polygons to form a topological surface for playing the game in accordance with rules of the game, the game surface having:

a primary game surface having a conventional topology of a standard game board with a first edge, the primary game surface being output from the graphical user interface and being the visible portion visible via the display;

an additional game surface having a topology different from the standard game board with a second edge, the topology of the additional game surface including at least one of a mirrored surface and a 3D-surface, the additional game surface being the non-visible portion that is not visible via the display, wherein the primary game surface and the additional game surface are each divided into a plurality of game spaces and the first edge of the primary game surface is coupled to the second edge of the additional game surface, there being a continuous bijective mapping between the visible primary game surface and the non-visible additional game surface such that the game surface continues past at least the first edge of the visible primary game surface to the non-visible additional game surface;

providing a game piece controller comprising a processor and a non-transitory computer readable memory, the memory storing executable instructions which, when executed by the processor, cause the processor to perform a plurality of functions of the game piece controller;

positioning, using the game piece controller, a plurality of game pieces on the primary game surface such that each game piece is positioned on a respective one of the plurality of game spaces of the primary game surface in accordance with the rules of the game and being visible via the display;

propagating, using the game piece controller, the positions of a plurality of additional game pieces on corresponding game spaces of the additional game surface automatically according to the rules of the game and the bijective mapping between the primary game surface and the additional game surface, there being at least one additional game piece corresponding to each of the game pieces on the primary game surface, the additional game pieces not being visible via the display, moving, using the game piece controller, a selected visible game piece on the primary game surface to a different game space on the primary game surface in response to an input command including a movement signal provided by the user via the graphical user interface, moving, using the game piece controller, simultaneously with the move of the selected game piece on the primary game surface, at least one of the corresponding additional game pieces on the additional game surface to a corresponding different game space on the additional game surface non-visible via the display and any non-corresponding additional game pieces affected by the move of the selected game piece in accordance with the rules of the game, wherein the game piece controller simulates movement of the additional game pieces on the additional game surface by moving only the game pieces on the primary game surface, and emulating, using the game piece controller, an application of the rules of the game being played on the visible primary game surface to the non-visible additional game surface to ensure that the move of the non-visible additional game pieces is allowable in accordance with the rules of the game or to ensure that at least another non-visible additional game piece has to be moved or removed in accordance with the rules of the game.

14. A computer-implemented method for providing a board game and for teaching a user to implement abstract thinking to play the game, the method comprising:

providing a graphical user interface providing an output to be displayed to the user, the output including a visible portion of a game surface for playing the game, the game surface including the visible portion and a non-visible portion, wherein the user inputs commands via the graphical user interface to play the game;

displaying, via a display, the graphical user interface output from the graphical user interface to the user, the graphical user interface output including the visible portion of the game surface viewable by the user on the display and excludes the non-visible portion of the game surface;

generating the game surface for playing the game in accordance with rules of the game, using a game surface generator comprising a processor and a non-transitory computer readable memory, the memory storing executable instructions which, when executed by the processor; cause the processor to generate the game surface by generating and connecting a plurality of polygons to form a topological surface for playing the game in accordance with rules of the game;

dividing, using the game surface generator, the game surface into an array of game spaces, wherein from any one perspective only a portion of the game surface is visible via the display, the game surface having:

the visible portion having a conventional topology of a standard game board being output from the graphical user interface and being visible via the display; and the non-visible portion being non-visible via the display, the non-visible portion having a topology different from the standard game board, the topology of the non-visible portion including at least one of a mirrored surface and a 3D-surface, there being continuity between the visible portion of the game surface and the non-visible portion of the game surface such that the game surface continues past at least the first edge of the visible portion of the game surface to the non-visible portion of the game surface and there being a continuous bijective mapping between the visible and non-visible portions of the game surface;

displaying the visible portion of the game surface to the user via the display;

providing a game piece controller comprising a processor and a non-transitory computer readable memory, the memory storing executable instructions which, when executed by the processor, cause the processor to perform a plurality of functions of the game piece controller;

positioning, with the game piece controller, a plurality of game pieces on the visible portion of the game surface such that each game piece is positioned on a respective one of the plurality of game spaces in accordance with the rules of the game and being visible via the display;

propagating, with the game piece controller, the positions of a plurality of additional game pieces on corresponding game spaces of the non-visible portion of the game surface automatically according to the rules of the game and the bijective mapping between the visible portion of the game surface and the non-visible portion of the game surface, there being at least one additional game piece on the visible portion corresponding to each of the game pieces on the non-visible portion of the game surface;

moving, with the game piece controller, a selected game piece on the visible portion of the game surface to a different game space on the visible portion of the game surface in response to a movement input command including a movement signal provided by the user via the graphical user interface, moving, with the game piece controller, simultaneously with the move of the selected game piece on the visible portion of the game surface at least one of the corresponding additional game pieces on the non-visible portion of the game surface to a corresponding different game space on the non-visible portion of the game surface and any non-corresponding additional game pieces affected by the move of the selected game piece in accordance with the rules of the game, wherein the game piece controller simulates movement of the additional game pieces on the non-visible portion of the game surface by moving only the game pieces on the visible portion of the game surface, and emulating, with the game piece controller, an application of the rules of the game being played on the visible portion of the game surface to the non-visible portion of the game surface to ensure that the move of the non-visible additional game pieces is allowable in accordance with the rules of the game or to ensure that at least another additional game piece has to be moved or removed in accordance with the rules of the game.

15. A non-transitory computer readable medium comprising instructions which, when executed by a computing device having a processor and a memory, cause the computing device to:

provide a graphical user interface providing an output to be displayed to a user, the output including a visible portion of a game surface for playing a game, the game surface including the visible portion and a non-visible portion, wherein the user inputs commands via the graphical user interface to play the game;

display, via a display, the graphical user interface output from the graphical user interface to the user, the graphical user interface output includes the visible portion of the game surface viewable by the user on the display and excludes the non-visible portion of the game surface;

generate the game surface by generating and connecting a plurality of polygons to form a topological surface for playing the game in accordance with rules of the game, the game surface having:

a primary game surface having a conventional topology of a standard game board with a first edge, the primary game surface being output from the graphical user interface being the visible portion visible via the display;

an additional game surface having a topology different from the standard game board with a second edge, the topology of the additional game surface including at least one of a mirrored surface and a 3D-surface, the additional game surface being the non-visible portion not visible via the display; wherein the primary game surface and the additional game surface are each divided into a plurality of game spaces and the first edge of the visible primary game surface is coupled to the second edge of the non-visible additional game surface, there being a continuous bijective mapping between the primary game surface and the additional game surface such that the game surface continues past at least the first edge of the visible primary game surface to the non-visible additional game surface;

position a plurality of game pieces on the primary game surface such that each game piece is positioned on a respective one of the plurality of game spaces of the primary game surface in accordance with the rules of the game and being visible via the display, propagate the positions of a plurality of additional game pieces on corresponding game spaces of the additional game surface automatically according to the rules of the game and the bijective mapping between the primary game surface and the additional game surface, there being at least one additional game piece corresponding to each of the game pieces on the primary surface, the additional game pieces not being visible via the display, move a selected visible game piece on the primary game surface to a different game space on the primary game surface in response to an input command including a movement signal provided by the user via the graphical user interface, move, simultaneously with the move of the selected game piece on the primary game surface, at least one of the corresponding additional game pieces on the additional game surface to a corresponding different game space on the additional game surface non-visible via the display and any non-corresponding additional game pieces affected by the move of the selected game piece in accordance with the rules of the game, wherein the game piece controller simulates movement of the additional game pieces on the additional game surface by moving only the game pieces on the primary game surface, and emulate an application of the rules of the game being played on the visible primary game surface to the non-visible additional game surface to ensure that the move of the non-visible additional game piece is allowable in accordance with the rules of the game or to ensure that at least another non-visible additional game piece has to be moved or removed in accordance with the rules of the game.

16. A non-transitory computer readable medium comprising instructions which, when executed by a computing device having a processor and a memory, cause the computing device to:

provide a graphical user interface providing an output to be displayed to a user, the output including a portion of a game surface for playing a game, the game surface including a visible portion and a non-visible portion wherein the user inputs commands via the graphical user interface to play the game;

display, via a display, the graphical user interface output from the graphical user interface to the user, the graphical user interface output includes the visible portion of the game surface viewable by the user on the display and excludes the non-visible portion of the game surface;

generate a game surface by generating and connecting a plurality of polygons to form a topological surface for playing the game in accordance with rules of the game;

divide the game surface into an array of game spaces, wherein from any one perspective only a portion of the game surface is visible via the display, the game surface having:

the visible portion being output from the graphical user interface and being visible via the display, the visible portion having a conventional topology of a standard game board; and the non-visible portion being non-visible via the display, the non-visible portion having a topology different from the standard game board, the topology of the non-visible portion including at least one of a mirrored surface and 3D-surface, there being continuity between the visible portion of the game surface and the non-visible portion of the game surface such that the game surface continues past at least the first edge of the visible portion of the game surface to the non-visible portion of the game surface and there being a continuous bijective mapping between the visible and non-visible portions of the game surface;

display the visible portion of the game surface to the user via the display;

position a plurality of game pieces on the visible portion of the game surface such that each game piece is positioned on a respective one of the plurality of game spaces on the visible portion of the game surface in accordance with the rules of the game and being visible via the display, there being at least one additional game piece corresponding to each of the game pieces on the visible portion of the game surface, the additional pieces not being visible via the display; and move a selected game piece on the visible portion of the game surface to a different game space on the visible portion of the game surface in response to a movement input command including a movement signal provided by the user via the graphical user interface;

move, simultaneously with the move of the selected game piece on the visible portion of the game surface, at least one of the corresponding non-visible additional game pieces on the non-visible portion of the game surface to a corresponding different game space on the non-visible portion of the game surface non-visible via the display and any non-corresponding additional game pieces affected by the move of the selected game piece in accordance with the rules of the game to simulate movement of the additional game pieces on the non-visible portion of the game surface by moving only the game pieces on the visible portion of the game surface, and emulate an application of the rules of the game being played on the visible portion of the game surface to the non-visible portion of the game surface to ensure that the move of the non-visible additional game piece is allowable in accordance with the rules of the game or to ensure that at least another additional game piece has to be moved or removed in accordance with the rules of the game.

\* \* \* \* \*